(12) United States Patent
Nozaki et al.

(10) Patent No.: US 7,285,770 B2
(45) Date of Patent: Oct. 23, 2007

(54) LIGHT SCANNING APPARATUS

(75) Inventors: Yoshiaki Nozaki, Iga (JP); Junichi Nakamura, Kashiba (JP); Shinichi Nakayama, Higashihiroshima (JP)

(73) Assignee: Sharp Kabushiki Kaisha, Osaka-shi (JP)

( * ) Notice: Subject to any disclaimer, the term of this patent is extended or adjusted under 35 U.S.C. 154(b) by 0 days.

(21) Appl. No.: 11/330,115

(22) Filed: Jan. 12, 2006

(65) Prior Publication Data

US 2006/0175544 A1 Aug. 10, 2006

(30) Foreign Application Priority Data

Jan. 12, 2005 (JP) .............................. P2005-005627

(51) Int. Cl.
*H01J 3/14* (2006.01)
*G02B 26/08* (2006.01)

(52) U.S. Cl. ...................... 250/234; 359/198

(58) Field of Classification Search ................ 250/216, 250/234, 236; 359/198, 214, 223, 224, 872
See application file for complete search history.

(56) References Cited

U.S. PATENT DOCUMENTS

| | | | |
|---|---|---|---|
| 5,367,373 A | 11/1994 | Busch-Vishniac et al. | |
| 5,648,618 A | 7/1997 | Neukermans et al. | |
| 6,262,827 B1 * | 7/2001 | Ueda et al. | 359/224 |
| 6,721,112 B2 | 4/2004 | Ikegame et al. | |
| 6,844,952 B2 * | 1/2005 | Dalziel | 359/224 |

FOREIGN PATENT DOCUMENTS

| | | |
|---|---|---|
| JP | 11-288444 A | 10/1999 |
| JP | 2002-524271 A | 8/2002 |
| WO | WO-00/13210 A2 | 3/2000 |

OTHER PUBLICATIONS

W.G. Pfann et al., Semiconducting Stress Transducers Utilizing the Transverse and Shear Piezoresistance Effects, Journal of Applied Physics, Oct. 1961, 2008, 32-10.

* cited by examiner

*Primary Examiner*—Kevin Pyo
(74) *Attorney, Agent, or Firm*—Birch, Stewart, Kolasch & Birch, LLP

(57) ABSTRACT

A light is emitted from a light emitting element toward the other surface in a thickness direction of a scanning mirror which can be angularly displaced about an axial line. At least either one of a first light receiving portion and a second light receiving portion receives a light which is emitted from the light emitting element and reflected by a reflecting mirror. The first light receiving portion, the second light receiving portion, and the signal output section produce an electronic signal containing position information which indicates a position which is irradiated with the above-mentioned light. This position information indicates an amount of angular displacement of the scanning mirror. On the basis of this position information, a driving section scans the scanning mirror so that the predetermined irradiation position can be irradiated with a light emitted from a first light source.

15 Claims, 24 Drawing Sheets

LIGHT SCANNING APPARATUS

BACKGROUND OF THE INVENTION

1. Field of the Invention

The present invention relates to a light scanning apparatus used in devices such as a barcode reader, a retina projection display, a laser printer, and a laser projector, which read still images and moving images by light scanning or which output still images and moving images by light scanning.

2. Description of the Related Art

For instance, in a laser projector, a predetermined vision is projected on a screen by irradiating a scanning mirror with a laser light and scanning the screen with the light reflected by the scanning mirror. In order to project the predetermined vision on the screen, a posture of the scanning mirror must be controlled. Since the scanning mirror is controlled on the basis of posture information indicating the posture of the scanning mirror, a present posture of the scanning mirror must be firstly detected in order to control the posture of the scanning mirror.

Further, in a light scanning apparatus which may cause light to enter human's eyes, irradiation of the light needs to be stopped immediately after light scanning is finished. On the basis of the posture information indicating the posture of the scanning mirror, it is possible to determine whether light scanning is being performed by the scanning mirror. Accordingly, in order to stop the irradiation of the light immediately after the light scanning is finished, the present posture of the scanning mirror must be firstly detected.

Furthermore, in the case where a vision is directly projected on a retina of eyeball by use of the light scanning apparatus, the retina may be damaged when the vision continues to be projected on a predetermined portion on the retina over a length of safety standard time while retaining the scanning mirror at a fixed posture. Accordingly, by measuring a time that the scanning mirror is retained at the fixed posture, the projection of the vision onto the retina must be stopped when the length of time that the scanning mirror at the fixed posture reaches the safety standard time. The length of time that the scanning mirror is retained at the fixed posture can be measured by detecting the posture of the scanning mirror. Consequently, the present posture of the scanning mirror must be detected.

FIG. 26 is a plan view showing a first related art posture detecting device 1 for detecting a posture of an object. FIG. 27 is a plan view showing an enlarged region II of FIG. 26.

In the first related art, posture information indicating the posture of the object is obtained by use of a property of silicon single crystal that electrical resistance thereof changes. The posture detecting device 1 comprises a movable portion 2, a support portion 3, and first connection portion 4A and second connecting portion 4B for coupling the movable portion 2 to the support portion 3. The movable portion 2 has a schematic rectangular parallelepiped shape formed of a platy body. The first connecting portion 4A and the second connecting portion 4B protrude in a direction away from a middle portion in a longitudinal direction of the movable portion 2. The movable portion 2 is connected to the support portion 3 by the first connecting portion 4A and second connecting portion 4B so that the movable portion 2 is angularly displaceable about an axial line which is perpendicular to thickness direction and longitudinal direction of the movable portion 2.

The first connection portion 4A is formed of silicon single crystal. The electrical resistance of the silicon single crystal changes by piezoresistance effect depending on stress which is added thereto. When the movable portion 2 is angularly displaced about the above-mentioned axial line, the stress is added to the first connecting portion 4A so that the electrical resistance of the first connection portion 4A formed of silicon single crystal changes by piezoresistance effect. By measuring this change amount of electrical resistance, it is possible to measure an amount of angular displacement of the movable portion 2.

In order to measure the change of the electrical resistance of the first connecting portion 4A, a four-terminal method is used. On one surface portion of the first connection portion 4A are formed a first electrode terminal 5A, a second electrode terminal 5B, a third electrode terminal 5C, and a four electrode terminal 5D. The first electrode terminal 5A and the second electrode terminal 5B are connected at a predetermined distance to parallel electrodes 6 which are electrically connected to a surface of the first connecting portion 4A while the third electrode terminal 5C and the fourth electrode terminal 5D are connected, between the parallel electrodes 6, at a predetermined distance to measuring electrodes which are electrically connected to the one surface of the first connecting portion 4A. By flowing constant electric current between the parallel electrodes via the first electrode terminal 5A and the second electrode terminal 5B so as to measure a voltage generated between the third electrode terminal 5C and the fourth electrode terminal 5D, it is possible to measure the change of the electrical resistance of the first connecting portion 4A (refer to, for instance, U.S. Pat. No. 5,648,618, Japanese Unexamined Patent Publication JP-A 2002-524271, and "Semiconducting Stress Transducers utilizing the Transverse and Shear Piezo Resistance Effects" written by W. G. Pfann and R. N. Thurston, on page 2008 in the Journal of Applied Physics, Vol. 32, No. 11 (1961)).

In a second related art, by use of induced electromotive force, a posture of a movable member capable of being angularly displaced about a predetermined axial line is detected. On the movable member is formed a loop-shaped speed detecting coil. Moreover, the movable member is disposed in a magnetostatic field. When the movable member is angularly displaced, a magnetic flux passing through a region surround by the speed detecting coil of the movable member changes so that the induced electromotive force is generated. By measuring a magnitude of this induced electromotive force, it is possible to measure an amount of angular displacement of the movable member (refer to, for instance, Japanese Unexamined Patent Publication JP-A 11-288444 (1999)).

In the first related art, the amount of angular displacement of the movable portion 2 is detected by measuring the electrical resistance of the first connecting portion 4A which changes depending on the to-be-added stress. However, the change amount of electrical resistance is subtle, and dependent on temperatures. The subtle change amount of electrical resistance is measured by use of the four-terminal method. In order to measure the resistance by use of the four-terminal method, a source of constant electric current is necessary. This leads the necessity of forming a constant electric current circuit. As a result, a problem arises that a circuit for measuring the amount of angular displacement becomes complex. In addition, since the change amount of electrical resistance is subtle, an amplifying circuit for amplifying detected electrical resistance information becomes necessary, which causes a problem that the circuit becomes more complex. Furthermore, in a case where the movable portion 2 is irradiated with a light and then displaced, thereby performing scanning with a light reflected by the movable portion 2, a temperature of the movable portion 2 increases by the emitted light so that a temperature of the first connection portion 4A in contact with the movable portion 2 also increases. Since the change amount of electrical resistance of the first connecting portion 4A is dependent on temperatures, a problem arises that the amount of angular displacement of the movable portion 2 cannot be correctly measured. Particularly, in a case where a diameter of the first connecting portion 4A is as small as several tens of μm, heat generated on the movable portion 2 is more hardly transferred to the support portion 3 via the first connecting portion 4A so that the temperature of the movable portion 2 further increases. Accordingly, the temperature of the first connecting portion 4A further increases, which causes a problem that the amount of angular displacement of the movable portion 2 cannot be correctly measured. In addition, the temperature of the first connecting portion 4A changes also by an atmosphere temperature of the first connecting portion 4A, which causes a problem that the amount of angular displacement of the movable portion 2 cannot be correctly measured.

In the second related art, the amount of angular displacement of the movable member is measured by measuring the magnitude of the induced electromotive force which is generated by the angular displacement of the movable member. In a case a light scanning apparatus comprising this movable member is disposed for use in a predetermined magnetic field, a magnetic field where the movable member is disposed changes. When the magnetic field having the movable member disposed therein changes, the magnetic flux in the region which is surrounded by the loop-shaped speed detecting coil formed on the movable member changes. Accordingly, the magnitude of the induced electromotive force generated by the angular displacement of the movable member also changes, which causes a problem that the amount of angular displacement of the movable member cannot be correctively detected. For instance, in a case where the light scanning apparatus is disposed in such a magnetic field that the magnetic flux in the region which is surrounded by the loop-shaped speed detecting coil formed on the movable member becomes zero, the induced electromotive force is not generated, even when the movable member is angularly displaced, so that the amount of angular displacement of the movable member cannot be detected.

SUMMARY OF THE INVENTION

Hence, an object of the invention is to provide a light scanning apparatus which can detect a posture of a reflector regardless of an environment that the reflector is disposed, and which can scan the reflector on the basis of posture information indicating the posture of the reflector so that a predetermined irradiation position can be irradiated with a light.

The invention provides a light scanning apparatus comprising:

a first light source for emitting a light beam with which a predetermined irradiation region is irradiated;

a reflector for reflecting the light beam emitted from the first light source so as to lead the light beam to the predetermined irradiation region;

a retaining frame having a plurality of coupling portions which are coupled to a circumferential edge portion of the reflector, for retaining the reflector via the coupling portions so that the reflector is angularly displaceable;

a second light source for emitting a light with which the reflector is to be irradiated;

a light receiving section for receiving a reflected light which has been emitted from the second light source and reflected by the reflector;

a driving section for angularly displacing the reflector so that the predetermined irradiation region is scanned with the light beam from the first light source; and a control section for controlling an angular displacement operation of the reflector through the driving section, on the basis of light receiving amount and light receiving region of the light received by the light receiving section.

According to the invention, the light receiving section receives reflected light which has been emitted from the second light source and reflected by the reflector. The light receiving amount and light receiving region of the light received by the light receiving section indicate the posture of the reflector. The driving section angularly displaces the reflector so that the predetermined irradiation region is scanned with the light beam from the first light source. The control section controls the angular displacement operation of the reflector through the driving section, on the basis of the light receiving amount and light receiving region of the light received by the light receiving section, which indicate the posture of the reflector. By so doing, the predetermined irradiation region can be scanned with the light beam from the first light source. This makes it possible to project a predetermined vision on a screen, for instance.

Further, without providing the second light source 2 and the light receiving section on the reflector, the control section can control the angular displacement operation of the reflector through the driving section, on the basis of the light receiving amount and light receiving region of the light received by the light receiving section, which indicate the posture of the reflector. When at least one of the second light source and the light receiving section is provided on the reflector, the reflector has a larger mass so that it becomes more difficult to control the displacement of the reflector. However, such a problem does not arise in the invention because the second light source and the light receiving section are not provided on the reflector.

Further, when a temperature of the reflector changes in a case where the second light source and the light receiving section are provided on the reflector, temperatures of the second light source and the light receiving section are caused to change under the influence of the temperature change of the reflector. However, in the invention, since the second light source and the light receiving section are not provided on the reflector, even when the temperature of the reflector changes, the second light source and the light receiving section come under less influence of the temperature change of the reflector. Accordingly, the temperatures of the second light source and the light receiving section change less easily, so that light emitting property and light receiving property do not depend on the temperatures. By so doing, the light receiving amount and light receiving region of the light received by the light receiving section, which indicate the posture of the reflector, are made to be less dependent on the temperatures.

Further, a traveling direction of the light emitted from the second light source does not change by electric field or magnetic field in a periphery of the second light source. Consequently, the light receiving amount and light receiving region of the light received by the light receiving section, which indicate the posture of the reflector, are not influenced by the electric field or magnetic field at a position where the light scanning apparatus is disposed.

Accordingly, the light receiving amount and light receiving region of the light received by the light receiving section, which indicate the posture of the reflector, indicate the posture of the reflector with high accuracy under no influence of the electric field or magnetic field at the position where the light scanning apparatus is disposed. The control section controls the angular displacement operation of the reflector through the driving section, on the basis of the light receiving amount and light receiving region of the light received by the light receiving section, which indicate the posture of the reflector with high accuracy. This makes it possible to control the angular displacement operation of the reflector with high accuracy so that the predetermined irradiation position can be irradiated with high accuracy with the light beam from the first light source.

Further, in the invention, it is preferable that the second light source is provided so that an incident angle of a light which is emitted from the second light source and enters the reflector becomes an acute angle.

According to the invention, the incident angle of the light which is emitted from the second light source and enters the reflector becomes an acute angle. In other words, the light, which is emitted from the second light source and enters the reflector, enters the reflector at a slant. By so doing, a distance that the light emitted from the second light source proceeds to the light receiving section, that is a light path, becomes longer than a light path in a case where the light emitted from the second light emitting element vertically enters the reflector. When the light path that the light follows from exit of the second light source to the light receiving section becomes longer, the posture of the reflector changes, and when the traveling direction of the light reflected by the reflector changes, the position of the light receiving region of the light receiving section for receiving the reflected light largely changes. That is to say, the position in the light receiving region for receiving the reflected light largely changes before and after the posture of the reflector changes. Since the position of the light receiving region of the reflected light largely changes even with respect to a slight displacement of the reflector, the light receiving amount and light receiving region of the light received by the light receiving section indicates the posture of the reflector with higher accuracy. The control section controls the angular displacement operation of the reflector through the driving section, on the basis of the light receiving amount and light receiving region of the light received by the light receiving section, which indicate the posture of the reflector with higher accuracy.

Further, according to the invention, the incident angle of the light which is emitted from the second light source and enters the reflector, becomes an acute angle, so that the light receiving amount and light receiving region of the light received by the light receiving section indicate the posture of the reflector with higher accuracy. The control section controls the angular displacement operation of the reflector through the driving section, on the basis of the light receiving amount and light receiving region of the light received by the light receiving section, which indicate the posture of the reflector with higher accuracy. This makes it possible to control the angular displacement operation of the reflector with high accuracy so that the predetermined irradiation position can be irradiated with high accuracy with the light beam from the first light source.

Further, in the invention, it is preferable that the retaining frame retains the reflector so that the reflector is angularly displaceable about a predetermined axial line, and the second light source is provided so that, on one virtual plane including a traveling direction of the reflected light which has been emitted from the second light source and reflected by the reflector and an extending direction of the predetermined axial line, an angle formed between the traveling direction of the reflected light and the extending direction of the predetermined axial line becomes a right angle.

According to the invention, the second light source is provided so that the angle formed between the traveling direction of the reflected light and the extending direction of the predetermined axial line becomes the right angle on the one virtual plane including the traveling direction of the reflected light reflected by the reflector and the extending direction of the predetermined axial line. Accordingly, the light receiving amount and light receiving region of the light received by the light receiving section indicate the posture of the reflector which is angularly displaced about the predetermined axial line. The control section controls the angular displacement operation of the reflector which is angularly displaceable about the predetermined axial line, on the basis of the light receiving amount and light receiving region of the light received by the light receiving section, which indicate the posture of the reflector that is angularly displaced about the predetermined axial line. This makes it possible to perform scanning with the light beam from the first light source, in a direction which is perpendicular to the predetermined axial line.

Further, in the invention, it is preferable that the light scanning apparatus further comprises a substrate, and that the light receiving section has a light receiving element which produces an electronic signal according to the light receiving amount and light receiving region of the received light, and a signal output section which outputs an electronic signal produced by the light receiving element, and the light receiving element and the signal output section are formed integrally with the substrate.

According to the invention, the light receiving element and the signal output section are formed integrally with the substrate. When the light receiving element and the signal output section are formed integrally with the substrate, a distance of a wiring for electrically connecting the light receiving element with the signal output section becomes shorter than a distance of the wiring in a case where the light receiving element and the signal output section are electrically connected to the substrate by wire bonding. When the distance of the wiring for connecting the light receiving element with the signal output section is longer, it becomes easier for signals other than an electronic signal produced by photoelectric conversion, to flow through the wiring as noise. When noise-causing electric current flows from the light receiving element to the signal output section, it is not possible to correctly output the light receiving amount and light receiving region of the light received by the light receiving section, which indicate the posture of the reflector. By integrally forming the light receiving element and the signal output section with the substrate, the distance of the wiring for electrically connecting the light receiving element with the signal output section becomes shorter so that the light receiving section less easily generates noise. Accordingly, the light receiving amount and light receiving region of the light received by the light receiving section indicate the posture of the reflector with high accuracy. The control section controls the angular displacement operation of the reflector through the driving section, on the basis of the light receiving amount and light receiving region of the light received by the light receiving section, which indicate the posture of the reflector with high accuracy. This makes it possible to control the angular displacement operation of the reflector with high accuracy so that the predetermined irradiation position can be irradiated with high accuracy with the light beam from the first light source.

Further, in the invention, it is preferable that the second light source is formed integrally with the substrate.

According to the invention, the light receiving element, the signal output section, and the second light source can be formed integrally with the substrate. This makes it possible to form the light receiving element, the signal output section, and the second light source in the substrate at the same step. Consequently, it is possible to simplify a manufacturing process of the light scanning apparatus so that a manufacturing cost of the light scanning apparatus can be held down, compared to a case where the second light source is provided in the substrate at a different step from the steps of providing the light receiving element and the signal output section.

Further, in the invention, it is preferable that the light scanning apparatus further comprises an element connecting portion, wherein the second light source has a light emitting element, and the light receiving section has a light receiving element, the light emitting element and the light receiving element being connected to the element connecting portion by flip chip bonding.

According to the invention, the light emitting element and the light receiving element are connected to the element connecting portion by flip chip bonding. Accordingly, a mounting density of the elements becomes higher than that in a case where the light emitting element and the light receiving element are connected by a connecting method using TAB (tape automated bonding) or wire bonding. This makes it possible to realize downsizing of the light scanning apparatus.

Further, in the invention, it is preferable that the light receiving section comprises at least two or more light receiving elements for producing an electronic signal according to the light receiving amount and light receiving region of the received light.

According to the invention, the light receiving section comprises at least two or more light receiving elements for producing the electronic signal according to the light receiving amount and light receiving region of the received reflected light. By increasing the number of the light receiving elements, the light receiving amount and light receiving region of the light received by the light receiving section indicate the posture of the reflector with higher accuracy. The control section controls the angular displacement operation of the reflector through the driving section, on the basis of the light receiving amount and light receiving region of the light received by the light receiving section, which indicate the posture of the reflector with higher accuracy. This makes it possible to control the angular displacement operation of the reflector with high accuracy so that the predetermined irradiation position can be irradiated with high accuracy with the light beam from the first light source.

Further, the invention provides a light scanning apparatus comprising:

a first light source for emitting a light beam with which a predetermined irradiation region is to be irradiated;

a reflector for reflecting the light beam emitted from the first light source so as to lead the light beam to the predetermined irradiation region;

a retaining frame having a plurality of coupling portions which are coupled to a circumferential edge portion of the reflector, for retaining the reflector via each of the coupling portions so that the reflector is angularly displaceable;

a second light source for emitting a light;

a light receiving section for receiving the light emitted from the second light source;

a driving section for angularly displacing the reflector so that the predetermined irradiation region is scanned with the light beam from the first light source; and a control section for controlling an angular displacement operation of the reflector through the driving section, on the basis of light receiving amount and light receiving region of the light received by the light receiving section, wherein the light receiving section has a light receiving element which produces an electronic signal according to the light receiving amount and light receiving region of the received light, and the second light source has a light emitting element, and wherein the reflector is provided with one of the light emitting element and the light receiving element, and the retaining frame is provided with the other one of the light emitting element and the light receiving element.

According to the invention, one of the light emitting element and the light receiving element is provided on the reflector while the other one of the light emitting element and the light receiving element is provided on the retaining frame. Further, the light receiving section receives the light emitted from the second light source. When the reflector is displaced, a relative position between the light emitting element and the light receiving element changes. When the relative position between the light emitting element and the light receiving element changes, a position of the light receiving region of the light which is emitted from the second light source and emitted to the light receiving section. Accordingly, the light receiving region indicates the posture of the reflector. The control section angularly displaces the reflector so that the predetermined irradiation region is scanned with the light beam from the first light source. The control section controls the angular displacement operation of the reflector through the driving section, on the basis of the light receiving amount and light receiving region of the light received by the light receiving section, which indicate the posture of the reflector. By so doing, the predetermined irradiation region can be scanned with the light beam from the first light source. This makes it possible to project a predetermined vision on a screen, for instance.

Further, in the invention, it is preferable that the retaining frame retains the reflector so that the reflector is angularly displaceable about a predetermined axial line, and one of the light emitting element and the light receiving element is provided on an end portion which is farthest away from the predetermined axial line of the reflector.

According to the invention, one of the light emitting element and the light receiving element is provided on the end portion which is the farthest away from the predetermined axial line of the reflector. The end portion which is the farthest away from the predetermined axial line of the reflector is displaced to the largest extent when the reflector is angularly displaced about the predetermined axial line of the reflector. That is to say, one of the light emitting element and the light receiving element, which is provided on a reflection face, is largely displaced when the reflector is displaced. Accordingly, the relative position between the light emitting element and the light receiving element largely changes. When the relative position between the light emitting element and the light receiving element largely changes, the position of the light receiving region of the light with which the light receiving section is irradiated, largely changes. By so doing, the light receiving amount and light receiving region of the light received by the light receiving section indicate the posture of the reflector with higher accuracy. The control section controls the angular displacement operation of the reflector through the driving section, on the basis of the light receiving amount and light receiving region of the light received by the light receiving section, which indicate the posture of the reflector with higher accuracy. This makes it possible to project a predetermined vision on a screen, for instance.

Further, in the invention, it is preferable that the retaining frame retains the reflector so that the reflector is angularly displaceable about a predetermined axial line, and one of the light emitting element and the light receiving element is provided in an extending direction of the predetermined axial line on an end portion of the reflector except on the predetermined axial line, and the second light source emits a light which proceeds in the extending direction of the predetermined axial line.

According to the invention, the reflector is angularly displaceable about the predetermined axial line, and one of the light emitting element and the light receiving element is provided in the extending direction of the predetermined axial line on the end portion of the reflector except on the predetermined axial line. In addition, the second light source emits the light which proceeds in parallel with the extending direction of the predetermined axial line. Accordingly, the light emitting element and the light receiving element are provided so as to face each other in the extending direction of the predetermined axial line so that the light emitting element and the light receiving element can be provided close to each other at the shortest distance. This makes it possible to realize downsizing of the light scanning apparatus.

Further, in the invention, it is preferable that the light receiving section comprises a signal output section which outputs an electronic signal produced by the light receiving element which is formed integrally with the reflector or the retaining frame, the signal output section being formed integrally with the reflector or the retaining frame.

According to the invention, the light receiving element is formed integrally with the reflector or the retaining frame while the signal output section is formed integrally with the reflector or the retaining frame. When the light receiving element and the signal output section are formed integrally with at least one of the reflector and the retaining frame, a distance of a wiring for electrically connecting the light receiving element with the signal output section becomes shorter than a distance of the wiring in a case where the light receiving element and the signal output section are electrically connected to at least one of the reflector and the retaining frame by wire bonding. When the distance of the wiring for connecting the light receiving element with the signal output section is longer, it becomes easier for signals other than an electronic signal produced by photoelectric conversion, to flow through the wiring as noise. When noise-causing electric current flows from the light receiving element to the signal output section, it is not possible to correctly output the light receiving amount and light receiving region of the light received by the light receiving section, which indicate the posture of the reflector. By forming the light receiving element and the signal output section integrally with one of the reflector and the retaining frame, the distance of the wiring for electrically connecting the light receiving element with the signal output section becomes shorter so that the light receiving section less easily generates noise. Accordingly, the light receiving amount and light receiving region of the light received by the light receiving section indicate the posture of the reflector with high accuracy. The control section controls the angular displacement operation of the reflector through the driving section, on the basis of the light receiving amount and light receiving region of the light received by the light receiving section, which indicate the posture of the reflector with high accuracy. This makes it possible to control the angular displacement operation of the reflector with high accuracy so that the predetermined irradiation position can be irradiated with high accuracy with the light beam from the first light source.

Further, in the invention, it is preferable that the light emitting element is formed integrally with the reflector or the retaining frame.

According to the invention, the light receiving element, the signal output section, and the light emitting element can be formed integrally with at least one of the reflector and the retaining frame. This makes it possible to form the light receiving element, the signal output section, and the light emitting element at the same step. By so doing, it is possible to simplify a manufacturing process of the light scanning apparatus so that a manufacturing cost of the light scanning apparatus can be held down, compared to a case where the second light source is provided in the substrate at a different step from the steps of providing the light receiving element and the signal output section.

Further, in the invention, it is preferable that the light receiving section comprises two or more light receiving elements.

According to the invention, the light receiving section comprises at least two or more light receiving elements for producing the electronic signal according to the light receiving amount and light receiving region of the received light. By increasing the number of the light receiving elements, the light receiving amount and light receiving region of the light received by the light receiving section indicate the posture of the reflector with higher accuracy. The control section controls the angular displacement operation of the reflector through the driving section, on the basis of the light receiving amount and light receiving region of the light received by the light receiving-section, which indicate the posture of the reflector with higher accuracy. This makes it possible to control the angular displacement operation of the reflector with high accuracy so that the predetermined irradiation position can be irradiated with high accuracy with the light beam from the first light source.

Further, in the invention, it is preferable that the first light source emits a light having a predetermined first wavelength, and the second light source emits a light having a predetermined second wavelength, and the light receiving section has a higher light receiving sensitivity to the light having the predetermined second wavelength than to the light having the predetermined first wavelength.

According to the invention, the first wavelength of the light emitted from the first light source is different from the second wavelength of the light emitted from the second light source. Moreover, the light receiving section has a higher light receiving sensitivity to the light having the second wavelength than to the light having the first wavelength. Accordingly, the light receiving section hardly detects the light emitted from the first light source. The light receiving section receives a light beam from the second light source. The control section controls the angular displacement operation of the reflector through the driving section, on the basis of the light receiving amount and light receiving region of the light received by the light receiving section. When the light receiving section detects the light from the first light source other than the light beam from the second light source, the light receiving amount and light receiving region of the light received by the light receiving section do not correctly indicate the posture of the reflector. Since the light receiving hardly detects the light from the first light source in the invention, the light receiving amount and light receiving region of the light received by the light receiving section indicate the posture of the reflector with higher accuracy. The control section controls the angular displacement operation of the reflector through the driving section, on the basis of the light receiving amount and light receiving region of the light received by the light receiving section, which indicate the posture of the reflector with higher accuracy. This makes it possible to control the angular displacement operation of the reflector with high accuracy so that the predetermined irradiation position can be irradiated with high accuracy with the light beam from the first light source.

Further, in the invention, it is preferable that the light scanning apparatus further comprises an element connecting portion to which the light emitting element and the light receiving element are connected by flip chip bonding.

According to the invention, the light emitting element and the light receiving element are connected to the element connecting portion by flip chip bonding. Accordingly, a mounting density of the elements becomes higher than that in a case where the light emitting element and the light receiving element are connected to the element connecting portion by a connecting method using TAB (tape automated bonding) or wire bonding.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERED EMBODIMENTS

Figure 1:
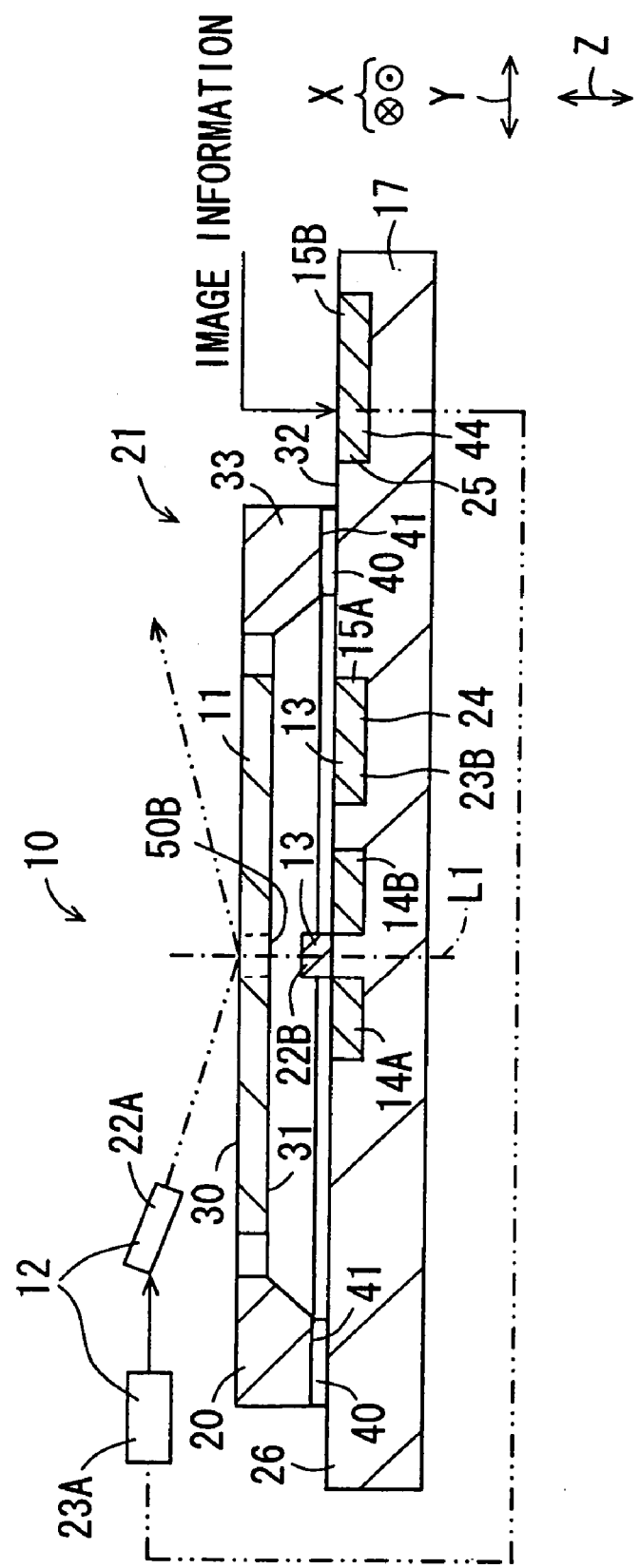
FIG. 1 is a sectional view showing a light scanning apparatus according to a first embodiment of the invention.

Now referring to the drawings, preferred embodiments of the invention are described below.

Figure 2:
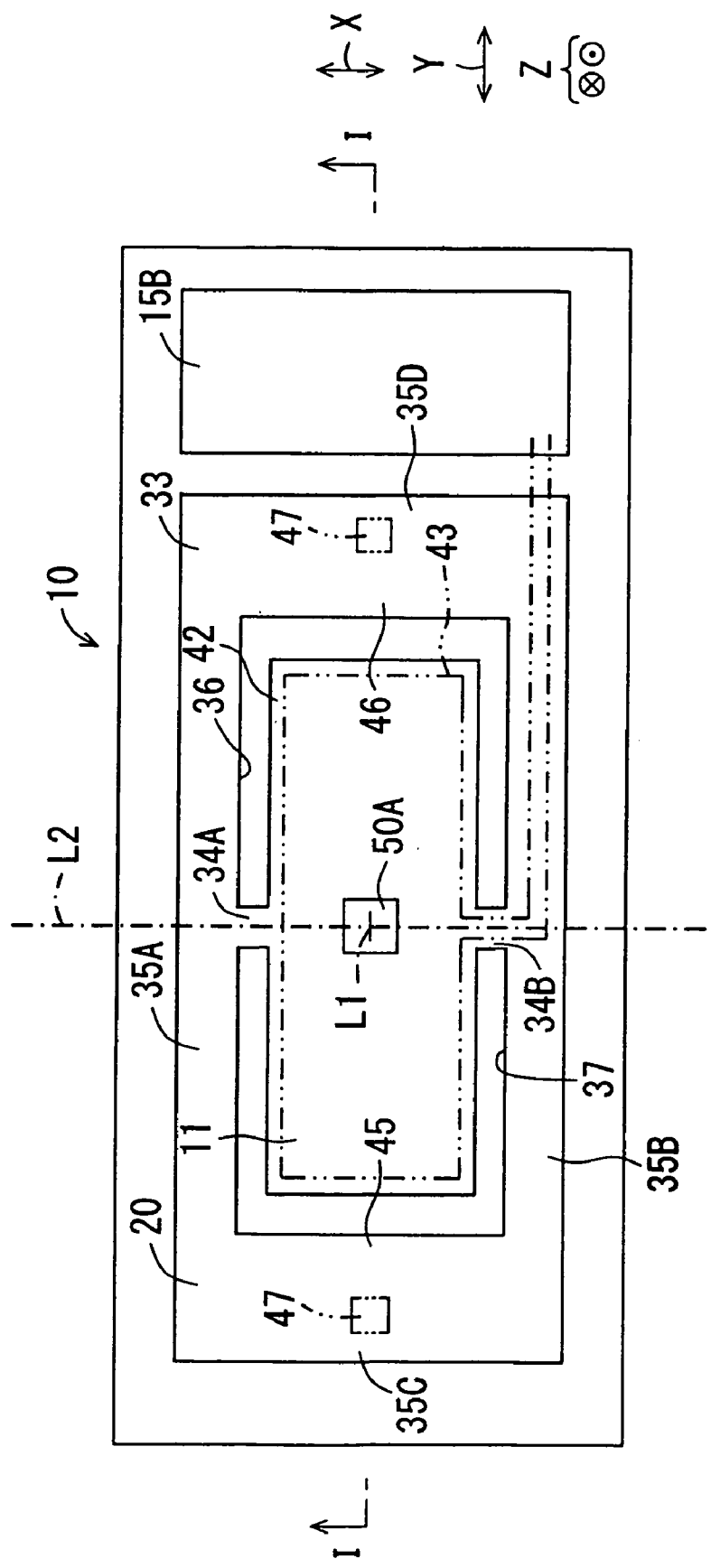
FIG. 2 is a plan view showing the light scanning apparatus according to the first embodiment of the invention.

FIG. 1 is a sectional view showing a light scanning apparatus 10 according to a first embodiment of the invention. FIG. 2 is a plan view showing the light scanning apparatus 10 according to the first embodiment of the invention. FIG. 1 is a sectional view showing the light scanning apparatus 10 taken along sectional lines I-I of FIG. 2.

The light scanning apparatus 10 comprises a scanning mirror 11, a first light source 12, a second light source 13, a first light receiving portion 14A, a second light receiving portion 14B, a first integrated circuit 15A, a second integrated circuit 15B, a base 17, a retaining frame 20, and a driving section 21.

The first light source 12 emits a light beam. The second light source 13 emits a light. In the embodiment, light includes ultraviolet radiation, visible radiation, and infrared radiation. The first light source 12 has a first light emitting element 22A and a first driving section 23A. The second light source 13 has a second light emitting element 22B and a second driving section 23B. The first driving section 23A supplies electric power to the first light emitting element 22A so that the first light emitting element 22A is made to emit a light beam. The second driving section 23B supplies electric power to the second light emitting element 22B so that the second light emitting element 22B is made to emit a light. The second driving section 23B is realized by the first integrated circuit 15A.

The first light receiving portion 14A and the second light receiving portion 14B receive a light, and convert the received light to electric current according to light quantity thereof. The electric current obtained by conversion through the first light receiving portion 14A and the second light receiving portion 14B is given to a signal output section 24.

The signal output section 24 amplifies the electric current given from the first receiving port ion 14A and the second receiving portion 14B, and outputs an electronic signal to a control section 25. The signal output section 24 is realized by the first integrated circuit 15A.

The control section 25 controls the first driving section 23A, the second driving section 23B, the signal output section 24, and the driving section 21. The control section 25 is realized by the second integrated circuit 15B.

A reflector is realized by the scanning mirror 11.

A light receiving portion comprises the first light receiving portion 14A, the second light receiving portion 14B, and the signal output section 24.

The base 17 has a schematic rectangular parallelepiped shape formed of a platy body. An axial line which is parallel to a thickness direction of the base 17 and which passes through the base 17 at a position closer to one side in a longitudinal direction from a center in a longitudinal direction of the base 17, and passes through a center in a transverse direction of the base 17, is referred to as a first axial line L1. On one surface portion 26 in the thickness direction of the base 17 are disposed the second light emitting element 22B, the first light receiving portion 14A, the second light receiving portion 14B, the first integrated circuit 15A, and the second integrated circuit 15B.

On the one surface portion 26 in the thickness direction of the base 17 are formed predetermined wirings. The wirings include a first wiring 27A, a second wiring 27B, a third wiring 27C, and a fourth wiring 27D. The second light emitting element 22B and the first integrated circuit 15A are electrically connected to each other via the first wiring 27A. The first light receiving portion 14A and the first integrated circuit 15A are electrically connected to each other via the second wiring 27B. The second light receiving portion 14B and the first integrated circuit 15A are electrically connected to each other via the third wiring 27C. The first integrated circuit 15A and the second integrated circuit 15B are electrically connected to each other via the fourth wiring 27D.

The scanning mirror 11 has a schematic rectangular parallelepiped shape formed of a platy body. The scanning mirror 11 is supported by the retaining frame 20 so as to be angularly displaceable about a second axial line L2 extending in a transverse direction of the scanning mirror 11. The scanning mirror 11 is disposed so that the first axial line L1 and the second axial line L2 are orthogonal to each other at a center point of the scanning mirror 11. A posture of the scanning mirror 11 at the time when one surface 30 in a thickness direction of the scanning mirror 11 is perpendicular to a direction that the first axial line L1 extends, is referred to as a standard posture of the scanning mirror 11. When the scanning mirror 11 is at a standard posture, the other surface 31 in the thickness direction of the scanning mirror 11 and one surface 32 in the thickness direction of the base 17 are opposed and parallel to each other.

A direction in which the first axial line L1 extends, is defined as a first direction Z. A direction in which the second axial line L2 extends, is defined as a second direction X. A direction which is perpendicular to the first direction Z and the second direction X, is defined as a third direction Y.

The retaining frame 20 comprises a frame 33, a first coupling portion 34A, and a second coupling portion 34B. The frame 33 has a first retaining frame forming portion 35A, a second retaining frame forming portion 35B, a third retaining frame forming portion 35C, and a fourth retaining frame forming portion 35D. These first to fourth retaining frames 35A, 35B, 35C and 35D are disposed in frame shape so as to constitute the frame 33. The retaining frame 20 is provided so that a thickness direction thereof corresponds to the first direction Z. The thickness direction of the retaining frame 20 indicates a direction in which a central axis of the frame 33 extends.

On the retaining frame 20 are formed predetermined wirings. The retaining frame 20 is provided on the base 17 so that an inner circumferential face of the frame 33 faces a side face of the scanning mirror 11 when the scanning mirror 11 is at the standard posture. The inner circumferential portion of the frame 33, facing the scanning mirror 11, is formed so that the other end portion in the first direction Z of the inner circumferential portion is farther away from the scanning mirror 11 than one end portion in the first direction Z of the inner circumferential portion. The first retaining frame forming portion 35A, the second retaining frame forming portion 35B, the third retaining frame forming portion 35C, and the fourth retaining frame forming portion 35D each form a schematic rectangular parallelepiped shape. The first retaining frame forming portion 35A is disposed on one side in the second direction X from the center portion of the scanning mirror 11. The second retaining frame forming portion 35B is disposed on the other side in the second direction X from the center portion of the scanning mirror 11. The third retaining frame forming portion 35C is disposed on one side in the third direction Y from the center portion of the scanning mirror 11. The fourth retaining frame forming portion 35D is disposed on the other side in the third direction Y from the center portion of the scanning mirror 11. The frame 33 is formed into a rectangular shape by respectively connecting one end portion in a longitudinal direction of the first retaining frame forming portion 35A with one end portion in a longitudinal direction of the third retaining frame forming portion 35C, connecting the other end portion in the longitudinal direction of the first retaining frame forming portion 35A with one end portion in a longitudinal direction of the fourth retaining frame forming portion 35D, connecting one end portion in a longitudinal direction of the second retaining frame forming portion 35B with the other end portion in the longitudinal direction of the third retaining frame forming portion 35C, and connecting the other end portion in the longitudinal direction of the second retaining frame forming portion 35B with the other end portion in the longitudinal direction of the fourth retaining frame forming portion 35D.

The first coupling portion 34A passes through the second axial line L2, and protrudes from one side face 36 of the first retaining frame forming portion 35A, facing the scanning mirror 11. The second coupling portion 34B passes through the second axial line L2, and protrudes from one side face 37 of the second retaining frame forming portion 35B, facing the scanning mirror 11. The scanning mirror 11 is respectively connected to the first coupling portion 34A and second coupling portion 34B. The scanning mirror 11 is thus connected physically to the frame 33 via these first coupling portion 34A and second coupling portion 34B.

The retaining frame 20 and the base 17 are physically connected to each other via a connecting portion 40. The connecting portion 40 is each disposed at four corners, which are away from the first axial line L1, of the other surface 41 in the first direction Z of the retaining frame 20. On the connecting portion 40 are formed predetermined wirings.

A circumferential edge portion 42 of the scanning mirror 11 has a loop-shaped coil 43 formed thereon. One end and the other end of this coil 43 are electrically connected to a coil driving section 44 via the wirings formed on the retaining frame 20, connecting portion 40, and base 17. The coil driving section 44 is realized by the second integrated circuit 15B. Moreover, a center portion in the longitudinal direction of the third retaining frame forming portion 35C, and a center portion in the longitudinal direction of the fourth retaining frame forming portion 35D are provided with permanent magnets 47. By providing the permanent magnet 47 on the retaining frame 20, a magnetostatic field is generated which penetrates a region surrounded by the loop-shaped coil 43 formed on the scanning mirror 11, from one side to the other side in the first direction Z. When electric current flows in the loop-shaped coil 43 on the scanning mirror 11 disposed in the magnetostatic field, Lorentz force is generated. This Lorentz force makes the scanning mirror 11 be angularly displaced about the second axial line L2. A magnitude of the Lorentz force depends on an amount of electric current flowing in the loop-shaped coil 43. A direction of the Lorentz force depends on a direction of the electric current flowing in the loop-shaped coil 43.

On the basis of a control command given from the control section 25, the coil driving section 44 determines the amount and direction of the electric current flowing in the loop-shape coil 43 on the scanning mirror 11, and supplies the electric current to the loop-shaped coil 43. The driving section 21 controls angular displacement of the scanning mirror 11. The driving section 21 comprises the loop-shaped coil 43, the permanent magnet, the coil driving section 44, and the wirings.

On the center portion of the one surface 30 in the thickness direction of the scanning mirror 11 is formed a first reflecting mirror 50A having a predetermined reflectivity, for reflecting a light. The first light source 12 is provided in one side in the first direction Z from the scanning mirror 11, and emits a light having a predetermined first wavelength $\lambda 1$ to the first reflecting mirror 50A on the scanning mirror 11. The light emitting element 22A is realized by a light emitting diode, a semiconductor laser, and the like. The first wavelength $\lambda 1$ is selected from 400 nm to 700 nm, for instance. The control section 25 controls the first driving section 23A. The first driving section 23A makes the first light emitting element 22A emit a light based on the control command given from the control section 25. The driving section 21 controls the angular displacement of the scanning mirror 11. By so doing, the light emitted from the first light emitting element 22A is reflected in a predetermined direction by the first reflecting mirror 50A. By so doing, a predetermined irradiation position can be irradiated with the light emitted from the first light emitting element 22A. In order that the driving section 21 controls the angular displacement of the scanning mirror 11, an amount of angular displacement from the standard posture of the scanning mirror 11 about the second axial line has to be detected.

Hereinafter, a mechanism for detecting the angular displacement of the scanning mirror 11 will be described.

Figure 3:
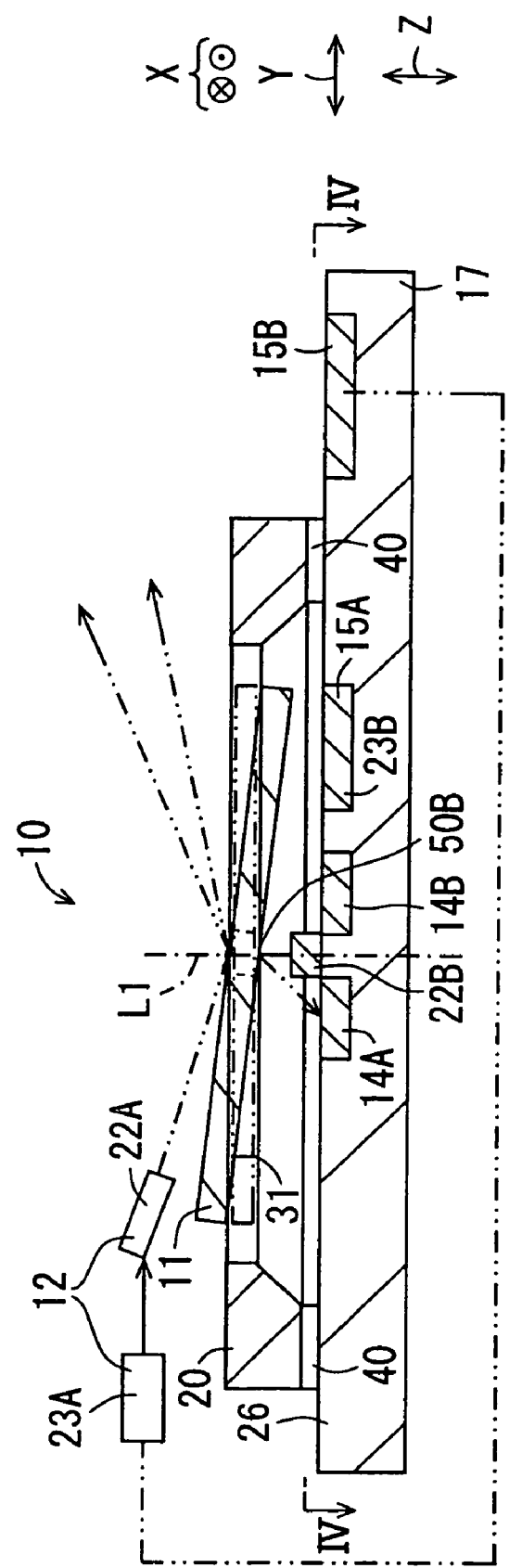
FIG. 3 is a sectional view showing a light scanning apparatus.
Figure 4:
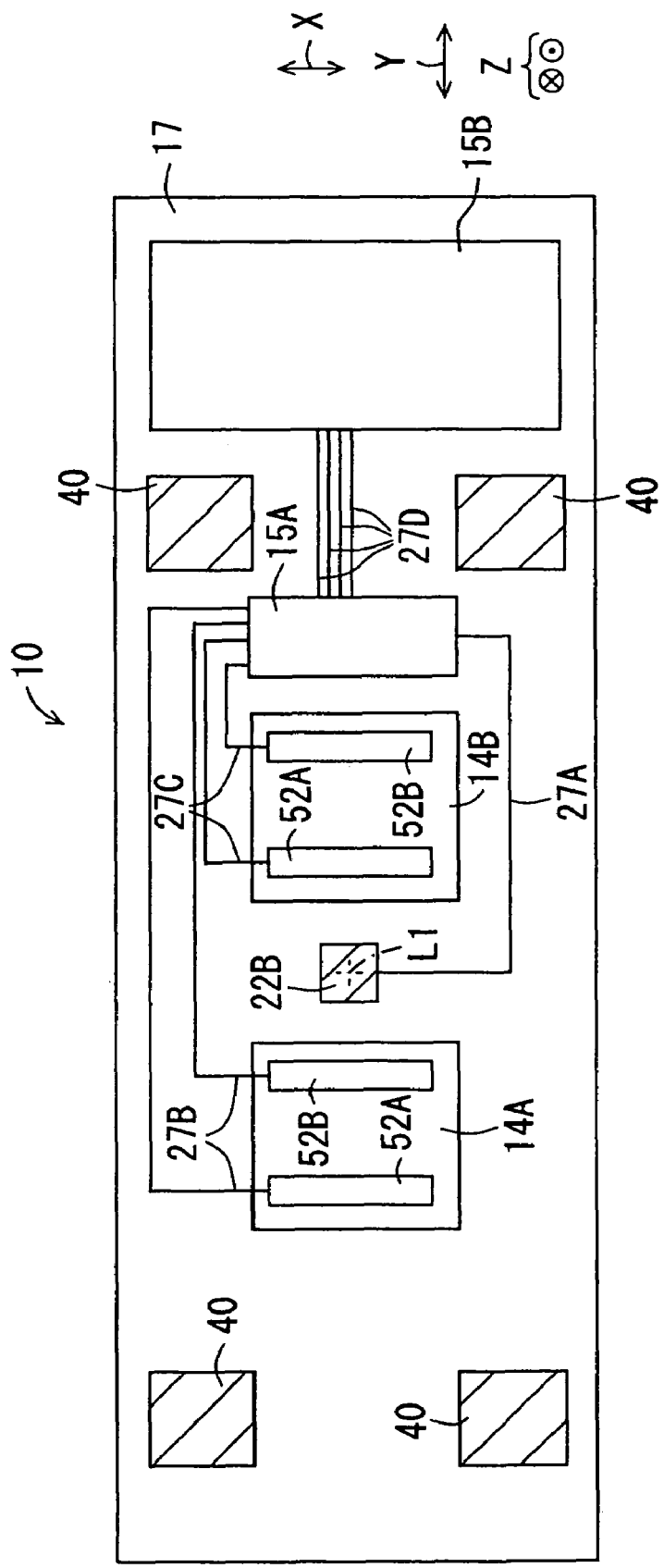
FIG. 4 is a sectional view showing the light scanning apparatus taken along sectional lines IV-IV of FIG. 3.
Figure 5:
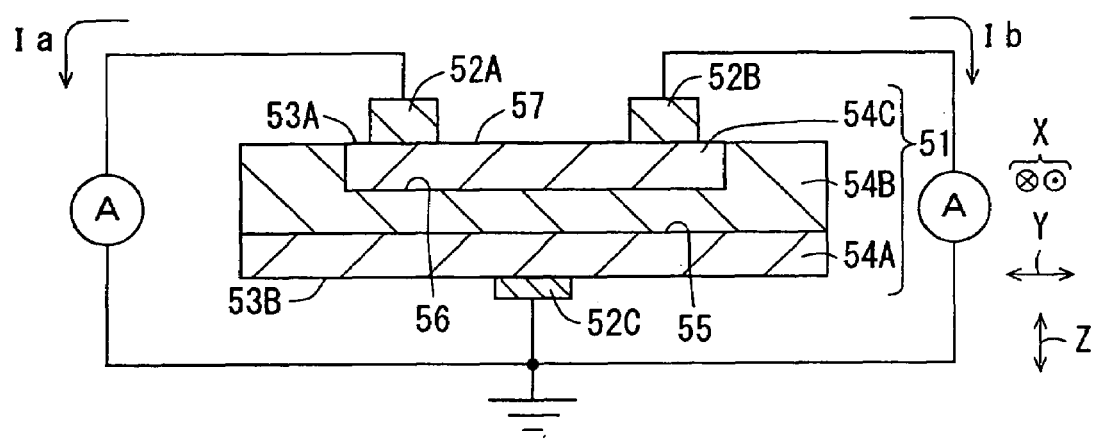
FIG. 5 is a sectional view schematically showing a first light receiving portion.

FIG. 3 is a sectional view showing the light scanning apparatus 10. FIG. 4 is a sectional view showing the light scanning apparatus 10 taken along sectional lines IV-IV of FIG. 3. FIG. 5 is a sectional view schematically showing the first light receiving portion 14A. The second light receiving portion 14B has the same constitution as that of the first light receiving portion 14A.

The second light emitting element 22B is provided on the first axial lie L1 of the one surface portion 26 in the thickness direction of the base 17. The second light emitting portion 22B emits a light having a predetermined second wavelength $\lambda 2$ from the other side to one side in the first direction Z. The second light emitting element 22B is realized by a light emitting diode, a semiconductor laser, and the like. The second wavelength $\lambda 2$ is selected from 650 nm to 900 nm. On the other surface 31 in the thickness direction of the scanning mirror 11 is formed a second reflecting mirror 50B having a predetermined reflectivity, for reflecting the light emitted from the second light emitting element 22B. This second reflecting mirror 50B makes the light emitted from the second light emitting element 22B be reflected toward the base 17.

The first light receiving portion 14A is provided on one side in the third direction Y from the second light emitting element 22B. The second light receiving portion 14B is provided on the other side in the third direction Y from the second light emitting element 22B. The first light receiving portion 14A and the second light receiving portion 14B have plane-symmetrical constitutions with respect to one virtual plane including the first axial line L1 and the second axial line L2. The first light receiving portion 14A and the second light receiving portion 14B are realized by position sensitive detector (abbreviated as PSD).

The first light receiving portion 14A and the second light receiving portion 14B each comprise a semiconductor layer 51 formed of silicon material, and a first electrode terminal 52A and a second electrode terminal 52B which are formed on one surface 53A in the first direction Z of the semiconductor layer 51, and a third electrode terminal 52C which is formed on the other surface 53B in the first direction Z of the semiconductor layer 51. The semiconductor layer 51 comprises an $N^+$ type semiconductor layer 54A, an N type or I type semiconductor layer 54B, and a $P^+$ type semiconductor layer 54C. The N type or I type semiconductor layer 54B is formed on one surface 55 in the first direction Z of the $N^+$ type semiconductor layer 54A. Alternatively, by dispersing phosphorus onto the one surface 55 of the I type semiconductor layer 54B, the $N^+$ type semiconductor layer 54A is formed. By dispersing boron, for instance, from one surface 57 in the first direction Z of the N type or I type semiconductor layer 54B, the $P^+$ type semiconductor layer 54C is formed. The first electrode terminal 52A is formed on one end portion in the third direction Y on the one surface 57 in the first direction Z of the $P^+$ type semiconductor layer 54C, the first electrode terminal 52A extending in parallel with the second direction X. The second electrode terminal 52B is formed on the other end portion in the third direction Y on the one surface 57 in the first direction Z of the $P^+$ type semiconductor layer 54C, the second electrode terminal 52B extending in parallel with the second direction X.

When the one surface in the first direction Z of the semiconductor layer 51 is irradiated with a light, electric current Ia which flows through the first electrode terminal 52A, and electric current Ib which flows through the second electrode terminal 52B, are generated. In a case where a portion closer to the first electrode terminal 52A than the second electrode terminal 52B on the one surface in the first direction Z of the semiconductor layer 51 is irradiated with a light, the electric current Ia flowing through the first electrode terminal 52A is larger than the electric current Ib flowing through the second electrode terminal 52B. In a contrary case where a portion closer to the second electrode terminal 52B than the first electrode terminal 52A on the one surface in the first direction Z of the semiconductor layer 51 is irradiated with a light, the electric current Ia flowing through the first electrode terminal 52A becomes smaller than the electric current Ib flowing through the second electrode terminal 52B. In other words, it is possible to detect positions in the third direction Y of light receiving regions of the first light receiving portion 14A and second light receiving portion 14B, from a proportion between the electric current Ia flowing through the first electrode terminal 52A and the electric current Ib flowing through the second electrode terminal 52B. The light receiving region indicates a region, which is irradiated with a light, on one surface in the first direction of the first light receiving portion 14A and the second light receiving portion 14B. A photodiode having the above-described constitution is referred to as a non-split type photodiode. The electric current flowing through the first electrode terminal 52A and the second electrode terminal 52B are each amplified by the signal output section 24, and outputted to the control section 25 as an electronic signal. The electronic signal outputted from the signal output section to the control section 25 includes position information indicating the position, which is irradiated with a light, in the third direction Y of the first light receiving portion 14A and second light receiving portion 14B.

The first light receiving portion 14A and the second light receiving portion 14B have a higher light receiving sensitivity to the light having the predetermined first wavelength $\lambda 1$ than to the light having the predetermined second wavelength $\lambda 2$. The first light receiving portion 14A and the second light receiving portion 14B have the highest light receiving sensitivity to a light having a predetermined third wavelength $\lambda 3$. The predetermined third wavelength $\lambda 3$ is selected from 700 nm to 900 nm, and more preferably selected so as to correspond to the predetermined second wavelength $\lambda 2$. Moreover, it is favorable that the first light receiving portion 14A and the second light receiving portion 14B cannot detect the light having the first wavelength $\lambda 1$.

The second driving section 23B supplies electric power to the second light emitting element 22B so that the second light emitting element 22B is made to emit a light. The control section 25 controls the second driving section 23B. The control section 25 controls the electric power to be supplied to the second light emitting element 22B by controlling the second driving section 23B, and controls intensity of the light emitted from the second light emitting element 22B.

The light which is emitted from the second light emitting element 22B and reflected by the second reflecting mirror 50B, is received by, for instance, the first light receiving portion 14A. And then, an electronic signal is outputted from the signal output section 24 to the control section 25. The electronic signal includes position information indicating a position in the third direction Y of the first light receiving portion 14A, on which position the light reflected by the second reflecting mirror 50B has impinged. It is possible to obtain from the position information a reflection angle of the light which is emitted from the second light emitting element 22B and reflected by the second reflecting mirror 50B can be obtained from the position information. This reflection angle contains information indicating an amount of angular displacement of the scanning mirror 11. Accordingly, it is possible to obtain from the position information an amount of angular displacement from the standard position of the scanning mirror 11.

Image information is given to the control section 25. The control section 25 outputs an operational command to the first driving section 23A based on the given image information. When the image information is given to the control section 25, on the basis of the given image information, a light is made to emit from the first light emitting element 22A by controlling the first driving section 23A. By controlling the coil driving section 44, the control section 25 controls, on the basis of the position information and the image information, the magnitude and direction of the electric current flowing in the loop-shaped coil 43 of the scanning mirror 11 so as to control the amount of angular displacement of the scanning mirror 11. By controlling the amount of angular displacement of the scanning mirror 11, it is possible to reflect the light emitted from the first light emitting element 22A, in a direction which is predetermined by the first reflecting mirror 50A. This makes it possible to project on a screen an image which is specified by the image information inputted to the control section 25.

In the light scanning apparatus 10 according to the embodiment, the second light emitting element 22B, the first light receiving portion 14A, and the second light receiving portion 14B are provided on the one surface portion 26 in the thickness direction of the base 17. When at least one of the second light emitting element 22B, the first light receiving portion 14A, and the second light receiving portion 14B is provided on the scanning mirror 11, the scanning mirror 11 has a larger mass so that it becomes more difficult to control the displacement of the scanning mirror 11. However, such a problem does not arise in the invention because the second light emitting element 22B, the first light receiving portion 14A, and the second light receiving portion 14B are not provided on the scanning mirror 11. Further, when a temperature of the scanning mirror 11 changes in a case where the second light emitting element 22B, the first light receiving portion 14A, and the second light receiving portion 14B are provided on the scanning mirror 11, temperatures of the second light emitting element 22B, first light receiving portion 14A, and second light receiving portion 14B are caused to change under the influence of the temperature change of the scanning mirror 11. However, in the invention, since the second light emitting element 22B, the first light receiving portion 14A, and the second light receiving portion 14B are not provided on the scanning mirror 11, even when the temperature of the scanning mirror 11 changes, the second light emitting element 22B, the first light receiving portion 14A, and the second light receiving portion 14B come under less influence of the temperature change of the scanning mirror 11. Accordingly, the temperatures of the second light emitting element 22B, first light receiving portion 14A, and second light receiving portion 14B change less easily, so that light emitting property and light receiving property do not depend on the temperatures. This causes the position information to be less dependent on the temperatures.

Moreover, as described above, in the light scanning apparatus 10, the electronic signal containing the position information which indicates the posture of the scanning mirror 11 is produced by use of light. A traveling direction of the light emitted from the second light emitting element 22B does not change by electric field or magnetic field in a periphery of the second light emitting element 22B. Consequently, it is possible to produce the electronic signal containing the position information which indicates the posture of the scanning mirror 11, regardless of the electric field or magnetic field at a position where the light scanning apparatus is disposed.

Accordingly, the first light receiving portion 14A and the second light receiving portion 14B can produce the electronic signal containing the position information with high accuracy under no influence of the temperature and the electric field or magnetic-field. This makes it possible to control the displacement of the scanning mirror 11 with high accuracy so that the light emitted from the first light source 12 can be emitted to the irradiation position with high accuracy.

Furthermore, the first wavelength λ1 of the light emitted from the first light emitting element 22A is different from the second wavelength λ2 of the light emitted from the second light emitting element 22B. The first light receiving portion 14A and the second light receiving portion 14B have higher light receiving sensitivity to the light having the second wavelength λ2 than to the light having the first wavelength λ1. Accordingly, the first light receiving portion 14A and the second light receiving portion 14B hardly detect the light emitted from the first light emitting element 22A. The first light receiving portion 14A and the second light receiving portion 14B produce the electronic signal containing the position information which indicates a position on which the light emitted from the second light emitting element 22B impinges. This position information indicates the posture of the scanning mirror 11. When the first light receiving portion 14A and the second light receiving portion 14B detect the light emitted from the first light emitting element 22A, it is not possible to produce an electronic signal containing correct position information. In the light scanning apparatus 10 in the embodiment, since the first light receiving portion 14A and the second light receiving portion 14b hardly detect the light emitted from the first light emitting element 22A, it is possible to produce the electronic signal containing the position information which indicates the posture of the scanning mirror 11 with higher accuracy. This makes it possible to control the displacement of the scanning mirror 11 with high accuracy so that the light emitted from the first light emitting element 22A can be emitted to the irradiation position with high accuracy.

In the light scanning apparatus 10 according to the embodiment, the predetermined first wavelength λ1 and the predetermined second wavelength λ2 are different from each other. However, the predetermined first wavelength λ1 and the predetermined second wavelength λ2 may be the same.

Moreover, in the light scanning apparatus 10 according to the embodiment, the permanent magnet 47 was provided on the third retaining frame forming portion 35C and the fourth retaining frame forming portion 35D. However, the permanent magnet 47 may be provided each on one side and the other side in the second direction X of the first reflecting mirror 50A, for instance, as long as the permanent magnet 47 is provided at a position where a magnetostatic field is generated, the magnetostatic field penetrating a region surrounded by the loop-shaped coil 43 formed on the scanning mirror 11, from one side to the other side in the first direction Z.

Furthermore, in the light scanning apparatus 10 according to the embodiment, the permanent magnet 47 was used for generating the magnetostatic field penetrating a region surrounded by the loop-shaped coil 43 formed on the scanning mirror 11, from one side to the other side in the first direction Z. However, an electromagnet may be used for generating the magnetostatic field.

Figure 6:
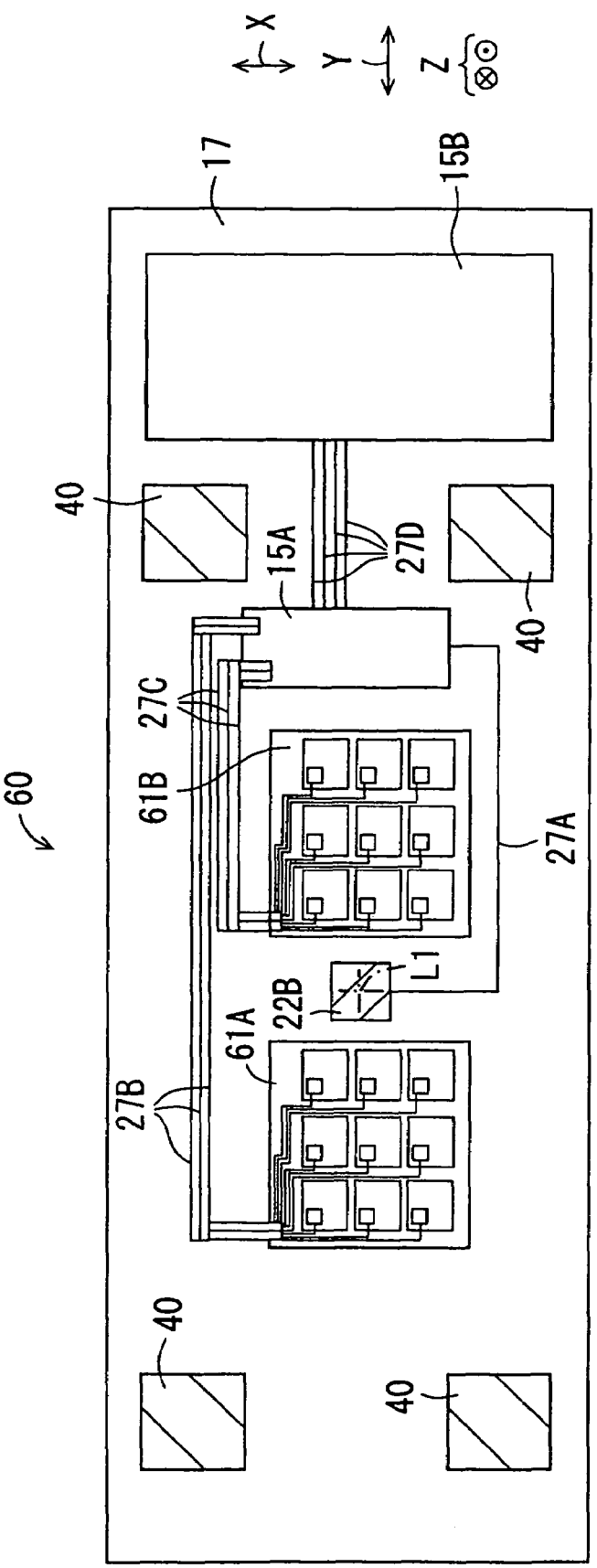
FIG. 6 is a sectional view showing a light scanning apparatus according to a second embodiment of the invention.
Figure 7:
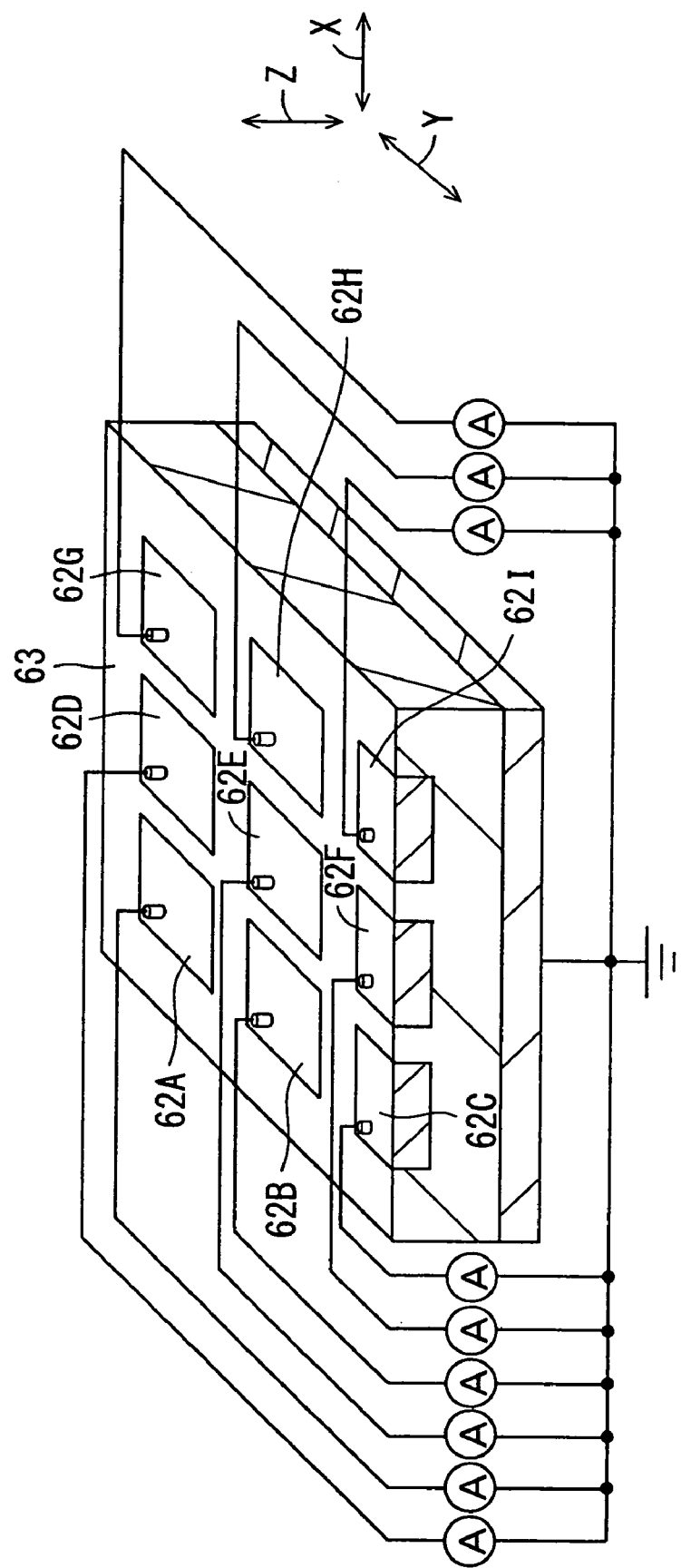
FIG. 7 is a perspective view schematically showing a first light receiving portion.

FIG. 6 is a sectional view showing a light scanning apparatus 60 according to a second embodiment of the invention. FIG. 7 is a perspective view schematically showing a first light receiving portion 61A. A second light receiving portion 61B has the same constitution as that of the first light receiving portion 61A.

The light scanning apparatus 60 comprises a scanning mirror 11, a first light source 12, a second light source 13, a first light receiving portion 61A, a second light receiving portion 61B, a first integrated circuit 15A, a second integrated circuit 15B, a base 17, a retaining frame 20, and a driving section 21.

The first light receiving portion 61A and second light receiving portion 61B of the light scanning apparatus 60 according to the second embodiment is different from the above-described first light receiving portion 14A and second light receiving portion 14B of the light scanning apparatus 10. Since the light scanning apparatus 60 according to the second embodiment has the same constitution as that of the light scanning apparatus 10 according to the first embodiment, corresponding portions are denoted by the same reference numerals so that overlapping descriptions thereof will be omitted. Since the light scanning apparatus 60 according to the second embodiment is similar to the light scanning apparatus 10 according to the first embodiment, the same effects of the light scanning apparatus 10 according to the first embodiment are obtained also in the light scanning apparatus 60 according to the second embodiment.

The first light receiving portion 61A is provided at the same position where the above-described first light receiving portion 14A according to the first embodiment is located. The second light receiving portion 61B is provided at the same position where the above-described second light receiving portion 14B according to the first embodiment is located. The first light receiving portion 61A comprises a first light receiving element 62A, a second light receiving element 62B, a third light receiving element 62C, a fourth light receiving element 62D, a fifth light receiving element 62E, a sixth light receiving element 62F, a seventh light receiving element 62G, an eighth light receiving element 62H, and a ninth light receiving element 62I. The first to ninth light receiving elements 62A to 62I are each composed of a PIN photodiode. The first light receiving portion 61A has such a configuration that the first to ninth light receiving elements 61A to 62I are arranged in a matrix having three rows and three columns, the three rows extending in parallel with the third direction Y, the three columns extending in parallel with the second direction X. Since each light receiving element of the first to ninth light receiving elements 62A to 62I is composed of the PIN photodiode, when a light receiving face of each light receiving element is irradiated with a light, electric current flows through an electrode of each of the light receiving elements according to light quantity of the light received by each light receiving element. From the electric current flowing through the electrode of each of the light receiving elements, it is possible to detect a position of a light receiving portion, which is irradiated with the light, on the one surface in the first direction Z of the first light receiving portion 61A and second light receiving portion 61B. The electric current flowing through the electrode of each of the light receiving elements is amplified in the signal output section 24, and outputted to the control section 25 as an electronic signal. The electronic signal outputted from the signal output section 24 to the control section 24 shows position information indicating the position, which is irradiated with the light, in the first direction Z of the first light receiving portion 61A and second light receiving portion 61B. The photodiode having the above-described constitution is referred to as a split type photodiode. The second light receiving portion 61B is a split type photodiode composed of nine PIN photodiodes, having the same constitution as that of the first light receiving portion 61A. As seen from one side in the first direction Z, a second light emitting element 21B is provided in the middle of a light segment connecting a point where diagonal lines of the one surface in the first direction Z of the first light receiving portion 61A intersect with each other, and a position where diagonal lines of the one surface in the first direction Z of the second light receiving portion 61B intersect with each other.

The first light receiving portion 61A and the second light receiving portion 61B comprise nine light receiving elements, respectively. The first light receiving portion 61A and the second light receiving portion 61B can each produce the electronic signal containing the position information which indicates the posture of the scanning mirror 11 with higher accuracy, with a simple constitution thereof for detecting the light quantity of the light received by each light receiving element. Since the scanning mirror 11 is displaced so that a predetermined irradiation position is irradiated with a light emitted from the first light source 12 based on the position information, the predetermined irradiation position can be irradiated with higher accuracy with the light emitted from the first light source 12.

The number of the PIN photodiodes constituting the split type photodiode is not limited to nine. With the larger number of the PIN photodiodes, it is possible to produce the electronic signal containing the position information which indicates the displacement of the scanning mirror with higher accuracy. In addition, the PIN photodiodes constituting the split type photodiode are not limited to being disposed in the matrix, but may be disposed in a row.

Figure 8:
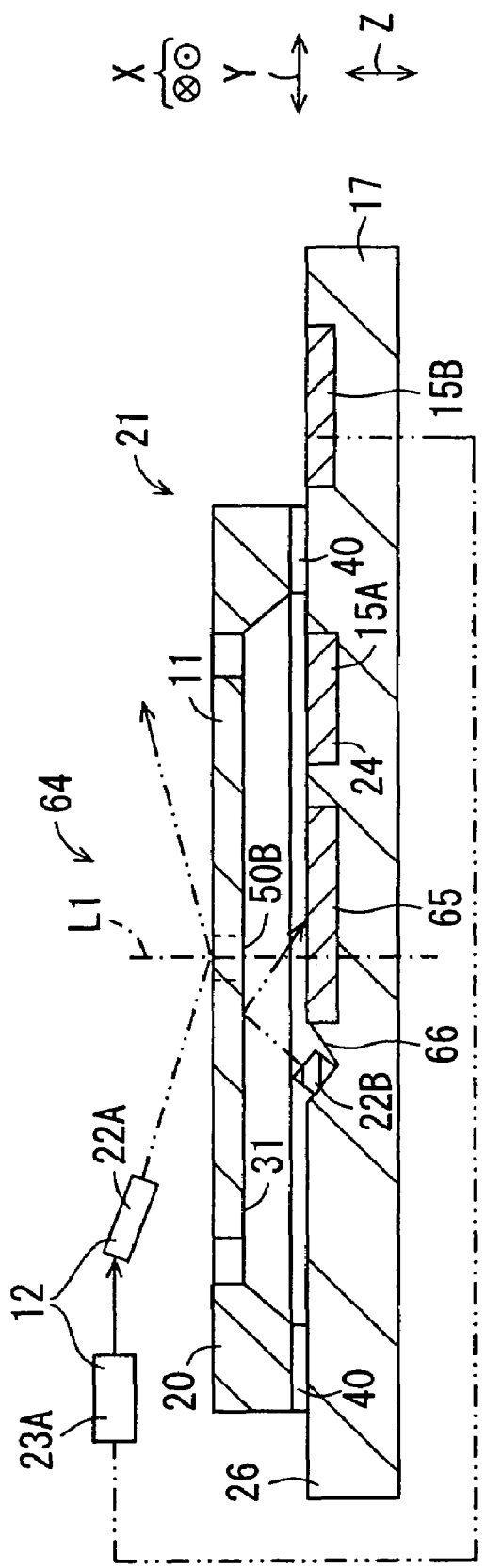
FIG. 8 is a sectional view showing a light scanning apparatus according to a third embodiment of the invention.
Figure 9:
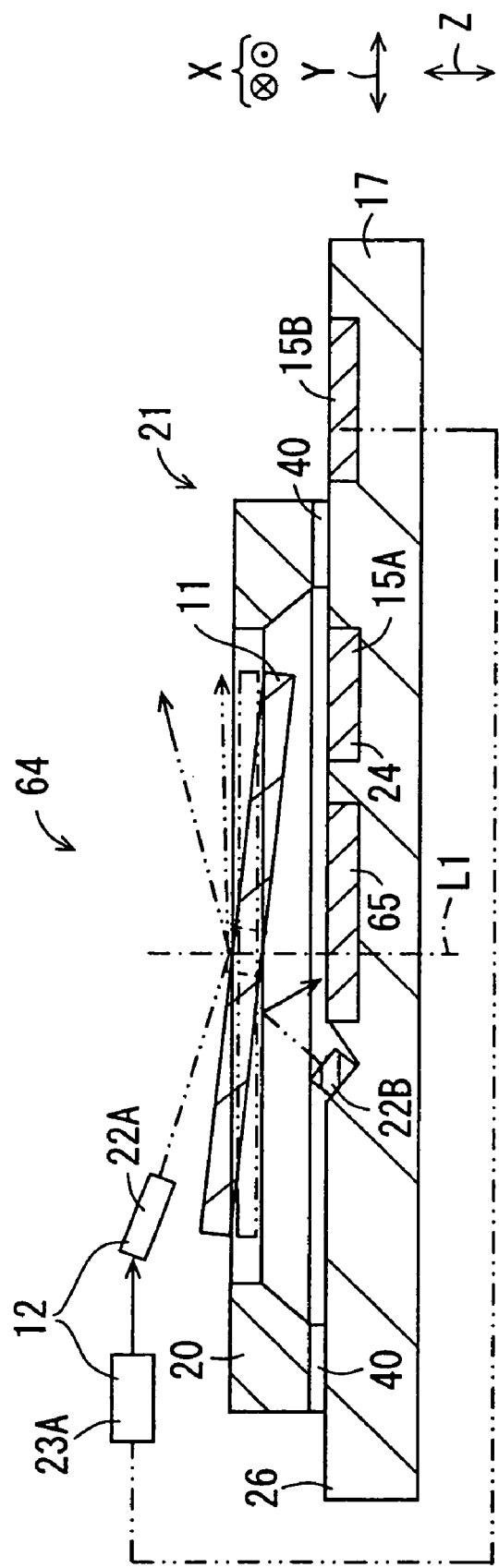
FIG. 9 is a sectional view showing the light scanning apparatus according to the third embodiment of the invention.
Figure 10:
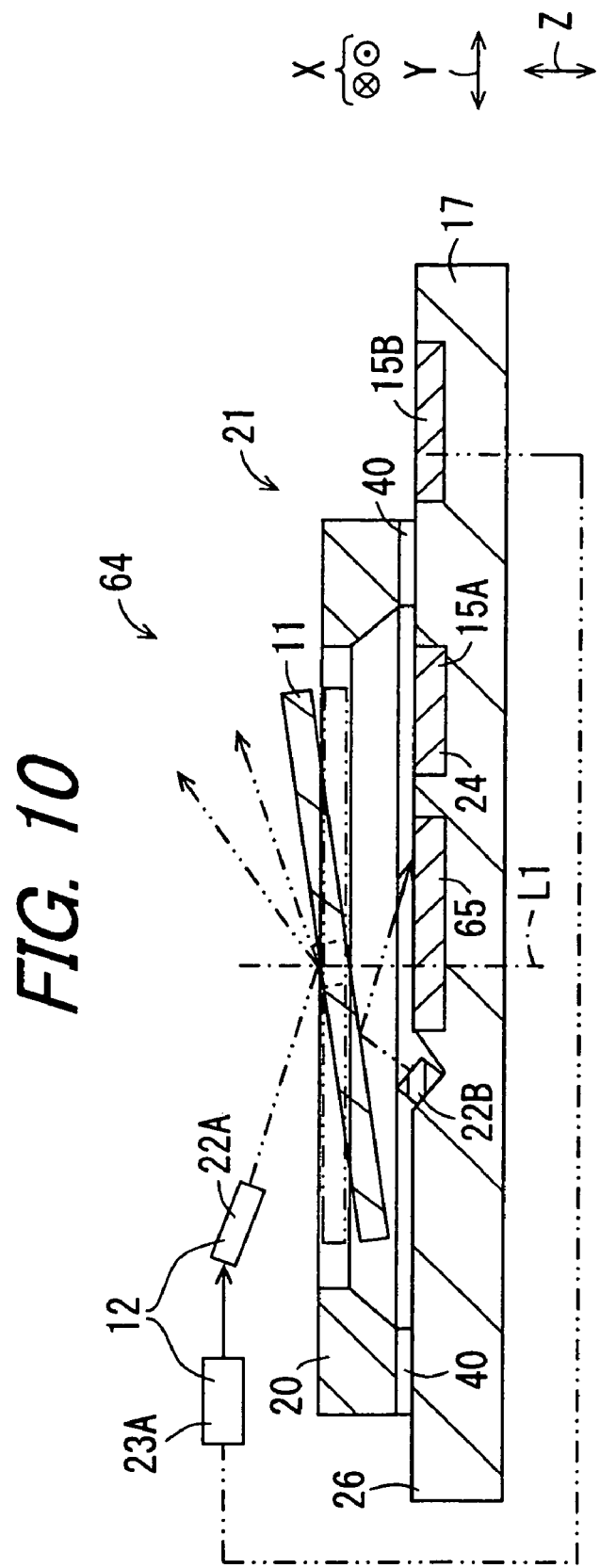
FIG. 10 is a sectional view showing the light scanning apparatus according to the third embodiment of the invention.

FIGS. 8, 9 and 10 are sectional views each showing a light scanning apparatus 64 according to a third embodiment of the invention.

The light scanning apparatus 64 comprises a scanning mirror 11, a first light source 12, a second light source 13, a light receiving portion 65, a first integrated circuit 15A, a second integrated circuit 15B, a base 17, a retaining frame 20, and a driving section 21. Since the light scanning apparatus 64 according to the third embodiment has the same constitution as that of the light scanning apparatus 10 according to the first embodiment, corresponding portions are denoted by the same reference numerals so that overlapping descriptions thereof will be omitted. Since the light scanning apparatus 64 according to the third embodiment is similar to the light scanning apparatus 10 according to the first embodiment, the same effects of the light scanning apparatus 10 according to the first embodiment are obtained also in the light scanning apparatus 64 according to the embodiment.

The second light emitting element 22B is provided in a groove portion 66 of the base 17. The groove portion 66 is formed on one predetermined side in the third direction Y from the first axial line L1. The groove portion 66 is formed by treating the base 17 with anisotropic etching using etching solution such as KOH. The second light emitting element 22B emits a light toward the other surface 31 in the thickness direction of the scanning mirror 11. The light emitted from the second light emitting element 22B passes through the second light emitting element 22B, and proceeds on one virtual plane which is perpendicular to the second direction X. The light emitted from the second light emitting element 22B impinges on the other side in the third direction Y on the other surface 31 in the thickness direction of the scanning mirror 11, from an axial line passing through the second light emitting element 22B and extending in parallel with the first direction Z. That is to say, when the scanning mirror 11 is at the standard position, a normal line direction of the other surface 31 in the thickness direction of the scanning mirror 11 and the emitting direction of the light emitted from the second light emitting element 22B, form an acute angle. In other words, the light emitted from the second light emitting element 22B enters the other surface 31 in the thickness direction of the scanning mirror 11 at a slant.

The light receiving portion 65 is provided on the one surface portion 26 in the thickness direction of the base 17 on the other side in the third direction Y from the second light emitting element 22B. The light receiving portion 65 is composed of the above-described non-split type photodiodes. The light receiving portion 65 and the signal output section 24 output to the control section 25 the electronic signal indicating a position of a light receiving region which is irradiated with a light, in the third direction Y.

The light emitted from the second light emitting element 22B enters a reflection face of the scanning mirror 11 at a slant whereby is reflected, and enters the light receiving portion 65. The light receiving portion 65 and the signal output section 24 can produce the electronic signal containing the position information which indicates a position in the third direction Y of a light receiving region of the light receiving portion 65, which region is irradiated with a light. A reflection angle of the light which is emitted from the second light emitting element 22B and reflected by the second reflecting mirror 50B can be obtained from the position information. This reflection angle contains information indicating the amount of angular displacement of the scanning mirror 11. Accordingly, it is possible to obtain from the position information the amount of angular displacement from the standard position of the scanning mirror 11. Moreover, the light emitted from the second light emitting element 22B enters the second reflecting mirror 50B at a slant. Consequently, a traveling direction of the light reflected by the second reflecting mirror 50B also makes an acute angle with a normal line direction of the second reflecting mirror 50B. In a case where the light emitted from the second light emitting element 22B enters the second reflecting mirror 50B at a slant and is reflected thereby, a distance that the light proceeds from a position where the light was reflected by the second reflecting mirror 50B to the light receiving region of the light receiving portion 65, that is a light path, becomes longer than a light path in a case where the light emitted from the second light emitting element 22B vertically enters the second reflecting mirror 50B. When the light path that the light follows from exit of the second light emitting element 22B to the light receiving region becomes longer, the posture of the scanning mirror 11 changes, and when the traveling direction of the light reflected by the second reflecting mirror 50B changes, the position of the light receiving region which is irradiated with the light largely changes. That is to say, the position in the light receiving region which position is irradiated with the reflected light largely changes before and after the posture of the scanning mirror 11 changes. This causes the position of the light receiving region which is irradiated with the light to largely change even with respect to a slight displacement of the scanning mirror 11, and therefore the position information indicates the posture of the scanning mirror 11 with high accuracy. Consequently, it is possible to detect the posture of the scanning mirror 11 with high accuracy.

Since the scanning mirror 11 is displaced so that a predetermined irradiation position is irradiated with a light emitted from the first light source 12 based on this position information, the predetermined irradiation position can be irradiated with high accuracy with the light emitted from the first light source 12.

Further, the light emitted from the second light emitting element 22B heads for the other side in the third direction Y from the second light emitting element 22B. By so doing, the light emitted from the second light emitting element 22B will never leak from the one side in the third direction Y of the second light emitting element 22B. An apparatus which may cause the light emitted from the second light emitting element 22B to enter human's eyes, needs to block the light from leaking therefrom. However, the light scanning apparatus 64 according to the embodiment does not need to take measures for blocking the light emitted from the second light emitting element 22B from leaking therefrom to the one side in the third direction Y of the second light emitting element 22B.

In the embodiment, the second light emitting element 22B is provided on the groove portion 66 and therefore, it becomes easy to position the second light emitting element 22B.

In the embodiment of the invention, the light receiving portion 65 was composed of the non-split type photodiodes, but may be composed of the split type photodiodes. By composing the receiving portion 65 of the split type photodiodes, it is possible to detect with high accuracy a position of the light receiving region of the light which reaches a light receiving face of the light receiving portion 65. Accordingly, it is possible to produce the electronic signal containing the position information which indicates the angular displacement of the scanning mirror 11 with higher accuracy. Since the posture of the scanning mirror 11 is controlled on the basis of this position information, it is possible to irradiate the predetermined irradiation position with higher accuracy with the light emitted from the first light source 12.

Figure 11:
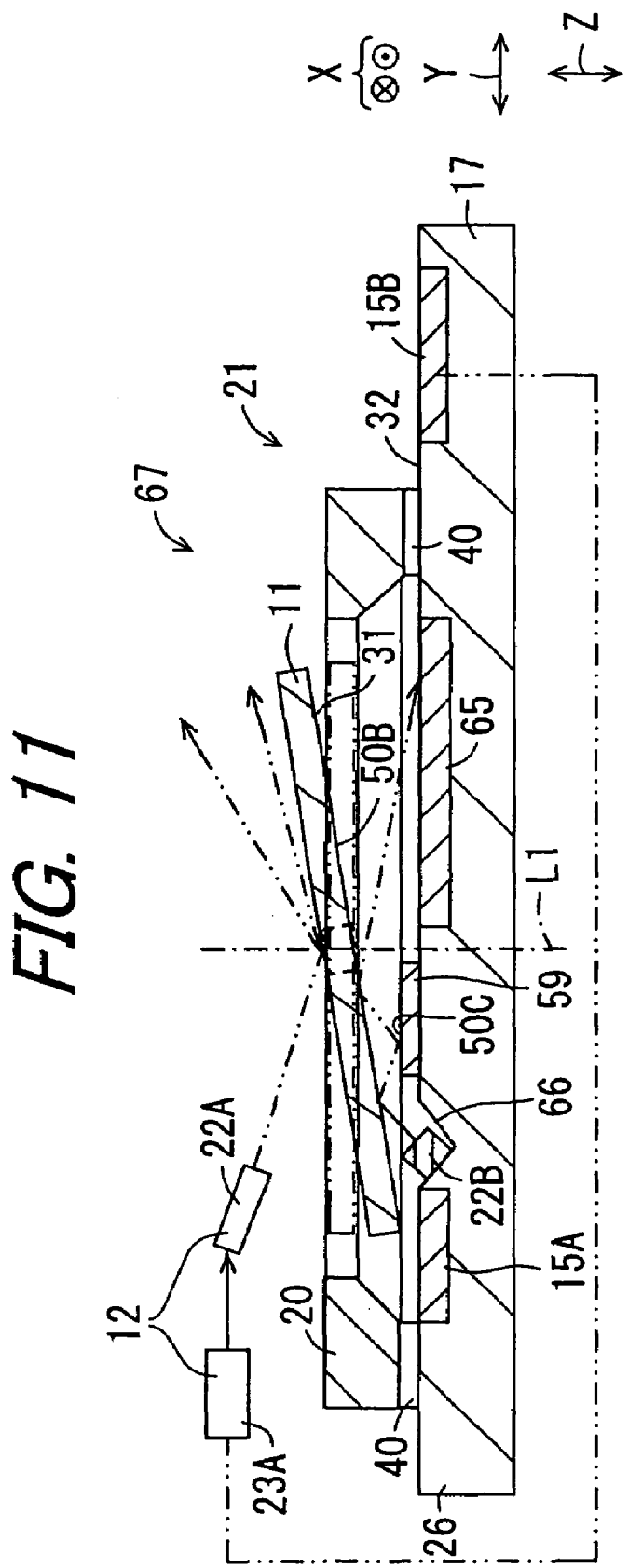
FIG. 11 is a sectional view showing a light scanning apparatus according to a fourth embodiment of the invention.

FIG. 11 is a sectional view showing a light scanning apparatus 67 according to a fourth embodiment of the invention. The light scanning apparatus 67 comprises a scanning mirror 11, a first light source 12, a second light source 13, a light receiving portion 65, a first integrated circuit 15A, a second integrated circuit 15B, a base 17, a retaining frame 20, a reflecting portion 59, and a driving section 21.

Since the light scanning apparatus 67 according to the fourth embodiment has the same constitution as that of the light scanning apparatus 64 according to the third embodiment, corresponding portions are denoted by the same reference numerals so that overlapping descriptions thereof will be omitted. Since the light scanning apparatus 67 according to the fourth embodiment is similar to the light scanning apparatus 64 according to the third embodiment, the same effects of the light scanning apparatus 64 according to the third embodiment are obtained also in the light scanning apparatus 67 according to the embodiment.

The first integrated circuit 15A, the second light emitting element 22B, the reflecting portion 59, and the light receiving portion 65 are respectively provided on the one surface portion 26 in the thickness direction of the base 17 in this order from one side to the other side in the third direction Y. The second light emitting element 22B is provided in the groove portion 66 of the base 17. On one surface in the first direction Z of the reflecting portion 59 is formed a third reflecting mirror 50C having a predetermined reflectivity.

The light emitted from the second light emitting element 22B is reflected by the second reflecting mirror 50B. The light reflected by the second reflecting mirror is reflected by the third reflecting mirror 50C. The light reflected by the third reflecting mirror 50C is reflected again by the second reflecting mirror SOB, and then arrived at the light receiving portion 65.

The light receiving portion 65 is composed of the above-described non-split type photodiodes. The light receiving portion 65 and the signal output section 24 output the electronic signal containing the position information which indicates a position in the third direction Y of the light receiving region irradiated with a light.

From the position information indicating a position in the third direction Y of the light receiving region irradiated with a light, it is possible to obtain reflection angles of the light emitted from the second light emitting element 22B when firstly reflected by the second reflecting mirror 50B and when reflected again by the second reflecting mirror 50B. The reflection angle indicates information about the angular displacement of the scanning mirror 11. Accordingly, the position information indicates the amount of angular displacement of the scanning mirror 11. Moreover, the light emitted from the second light emitting element 22B is reflected three times by the second reflecting mirror 50B, the third reflecting mirror 50C, and the second reflecting mirror 50B. Accordingly, in a case where the light reflected three times is detected by the light receiving portion 65, the light path that the light emitted from the second light emitting element 22B proceeds from the second light emitting element 22B to the light receiving portion 65 is longer than a light path in a case where the light reflected once by the second reflecting mirror 50B is detected by the light receiving portion 65. When the light path that the light follows from exit of the second light emitting element 22B to the light receiving portion 65 becomes longer, the posture of the scanning mirror 11 changes, and when the traveling direction of the light reflected by the second reflecting mirror 50B changes, the position of the light receiving region which is irradiated with the light largely changes. That is to say, the position in the light receiving region which position is irradiated with the reflected light largely changes before and after the posture of the scanning mirror 11 changes. This causes the position of the light receiving region which is irradiated with the light to largely change even with respect to a slight displacement of the scanning mirror 11, and therefore the position information indicates the posture of the scanning mirror 11 with high accuracy. Consequently, it is possible to detect the posture of the scanning mirror 11 with high accuracy.

Since the scanning mirror 11 is displaced so that the predetermined irradiation position is irradiated with the light emitted from the first light source 12 based on this position information, the predetermined irradiation position can be irradiated with high accuracy with the light emitted from the first light source 12.

In the light scanning apparatus 67 according to the embodiment, by use of the third reflecting mirror 50C, the distance that the light follows from exit of the second light emitting element 22B to the light receiving portion 65 can be made longer. Accordingly, it is possible to more effectively use a space between the other surface 31 in the thickness direction of the scanning mirror 11 and the one surface 32 in the thickness direction of the base 17. This enables to make the light scanning apparatus 10 smaller.

The light scanning apparatus 67 according to the embodiment of the invention has a constitution that the light emitted from the second light emitting element 22B is reflected three times before reaching the light receiving portion 65. However, the number of times that the light is reflected is not limited to three. The light scanning apparatus 67 may have a constitution that the light reaches the light receiving portion 65 after reflected four times or more.

In the embodiment of the invention, the light receiving portion 65 was composed of the non-split type photodiodes, but may be composed of the split type photodiodes. By composing the receiving portion 65 of the split type photodiodes, it is possible to detect with high accuracy a position of the light receiving region of the light which reaches the light receiving face of the light receiving portion 65. Accordingly, it is possible to produce the electronic signal containing the position information which indicates the angular displacement of the scanning mirror 11 with higher accuracy. Since the posture of the scanning mirror 11 is controlled on the basis of this position information, it is possible to irradiate the predetermined irradiation position with higher accuracy with the light emitted from the first light source 12.

Figure 12:
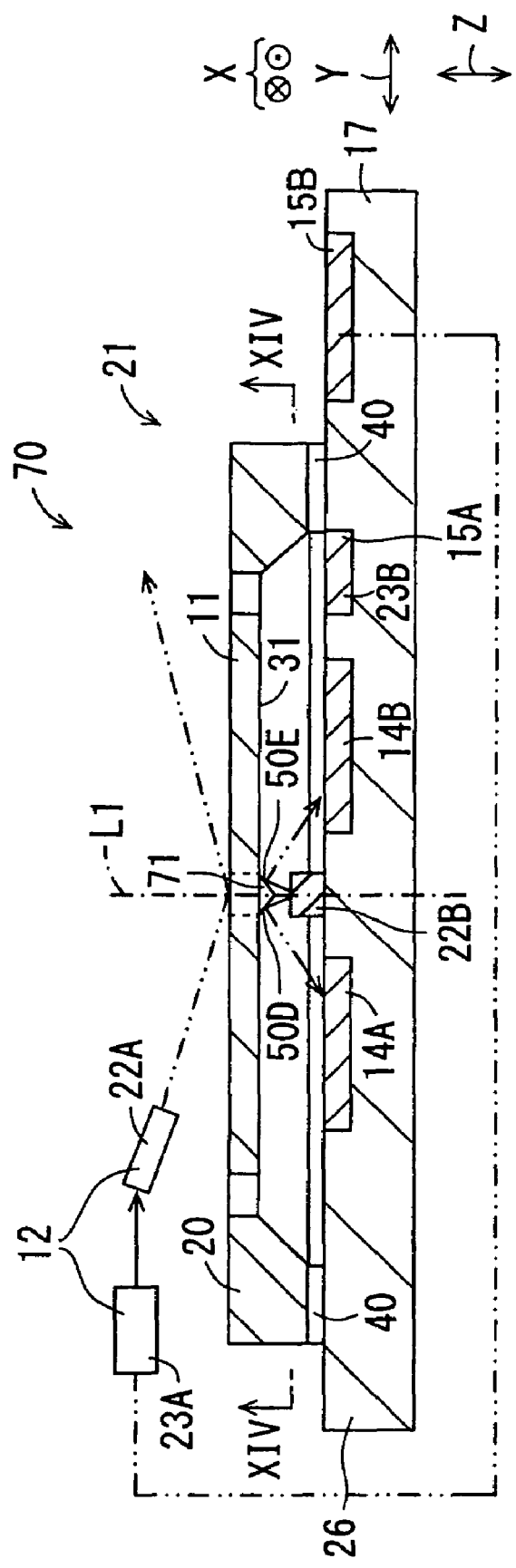
FIG. 12 is a sectional view showing a light scanning apparatus according to a fifth embodiment of the invention.
Figure 13:
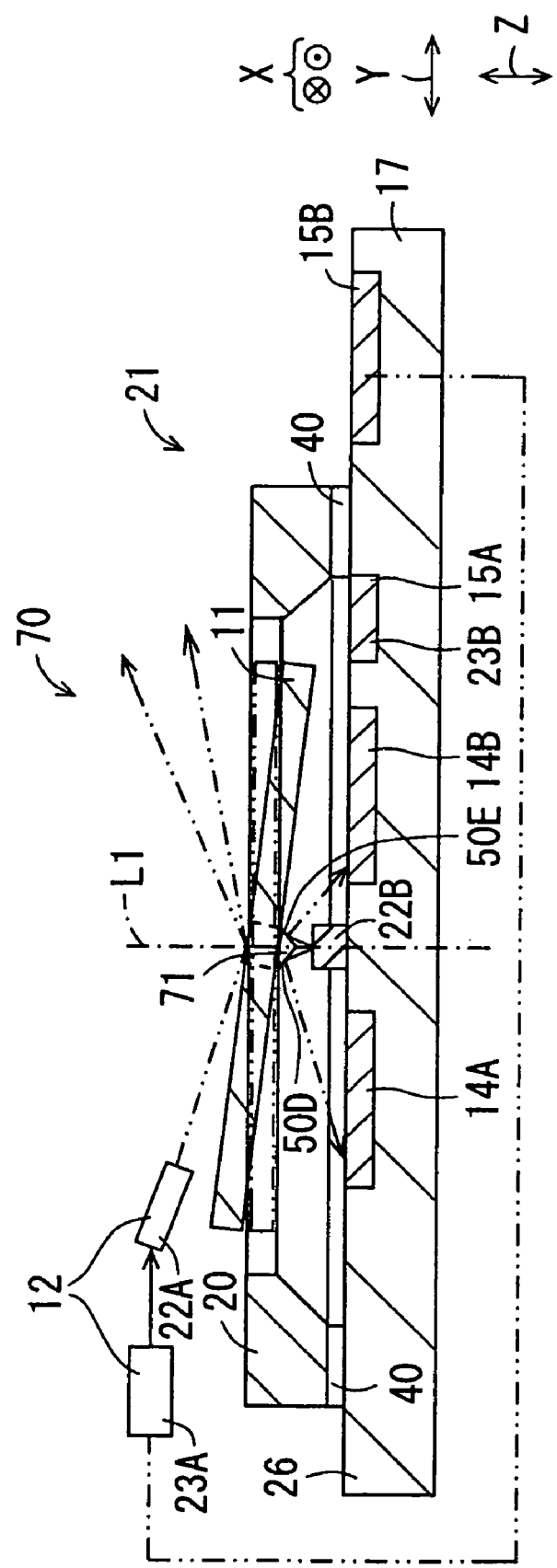
FIG. 13 is a sectional view showing the light scanning apparatus according to the fifth embodiment of the invention.
Figure 14:
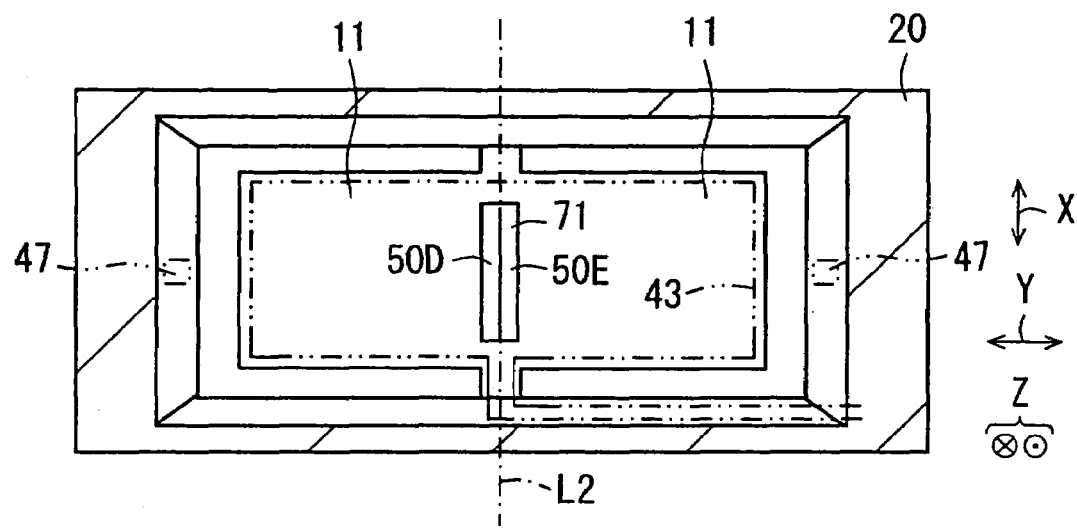
FIG. 14 is a sectional view showing the light scanning apparatus taken along sectional lines XIV-XIV of the FIG. 12.

FIGS. 12 and 13 are sectional views each showing a light scanning apparatus 70 according to a fifth embodiment of the invention. FIG. 14 is a sectional view showing the light scanning apparatus 70 taken along sectional lines XIV-XIV of the FIG. 12.

The light scanning apparatus 70 comprises a scanning mirror 11, a first light source 12, a second light source 13, a first light receiving portion 14A, a second light receiving portion 14B, a first integrated circuit 15A, a second integrated circuit 15B, a base 17, a retaining frame 20, and a driving section 21.

Since the light scanning apparatus 70 according to the fifth embodiment has the same constitution as that of the above-described light scanning apparatus 10 according to the first embodiment, corresponding portions are denoted by the same reference numerals so that overlapping descriptions thereof will be omitted. Since the light scanning apparatus 70 according to the fifth embodiment is similar to the light scanning apparatus 10 according to the first embodiment, the same effects of the light scanning apparatus 10 according to the first embodiment are obtained also in the light scanning apparatus 70 according to the embodiment.

On the other surface 31 in the thickness direction of the scanning mirror 11 is formed a reflecting protrusion 71 having a shape of triangle pole, which passes through the first axial line L1 and extends over one end to the other end in the second direction of the scanning mirror 11. A bottom face of the reflecting protrusion 71 is perpendicular to the second direction X. A section of the reflecting protrusion 71 taken along one virtual plane which is perpendicular to the second direction X has a shape of isosceles triangle having an apex thereof in a direction from the scanning mirror 11 to the base 17. A side face on one side in the third direction Y of the reflecting protrusion 71 is referred to as a fourth reflecting mirror 50D. A side face on the other side in the third direction Y of the reflecting protrusion 71 is referred to as a fifth reflecting mirror 50E. The fourth reflecting mirror 50D and the fifth reflecting mirror 50E each have a predetermined reflectivity, and reflect lights.

The second light emitting element 22B emits a light in the first direction Z. That is to say, the second light emitting element 22B emits a light to the reflecting protrusion 71. The light emitted from the second light emitting element 22B has a predetermined radiation angle. Accordingly, when the scanning mirror 11 is at the standard posture, the lights emitted from the second light emitting element 22B enter the fourth reflecting mirror 50D and the fifth reflecting mirror 50E whereby are reflected, and reach the first light receiving portion 14A and the second light receiving portion 14B. When the scanning mirror 11 is at the standard posture, light quantity of the light detected by the first light receiving portion 14A, and light quantity of the light detected by the second light receiving portion 14B are the same. In addition, the lights emitted from the second light emitting element 22B enter the fourth reflecting mirror 50D and the fifth reflecting mirror 50E at a slant. Accordingly, when the scanning mirror is at the standard posture without the reflecting protrusion 71, in a case where the light emitted from the second light emitting element 22B enters the fourth reflecting mirror 50D and the fifth reflecting mirror 50E at a slant, the distance that the light proceeds from the second light emitting element 22B to the first light receiving portion 14A or the second light receiving portion 14B, becomes longer than a case where the light emitted from the second light emitting element 22B vertically enters the other surface 31 in the thickness direction of the scanning mirror 11. Accordingly, in a case where the light emitted from the second light emitting element 22B enters the fourth reflecting mirror 50D and the fifth reflecting mirror 50E, by the angular displacement of the scanning mirror 11, a change amount of position of the light receiving regions on the first light receiving portion 14A and the second light receiving portion 14B which are irradiated with the light becomes larger. Consequently, it is possible to detect the angular displacement of the scanning mirror 11 with higher accuracy.

Furthermore, since the scanning mirror 11 has the reflecting protrusion 71, even when the scanning mirror 11 is at the standard posture, the light reflected by the reflecting protrusion 71 is reflected by the both light receiving portions of the first light receiving portion and the second light receiving portion 14B. That is to say, information indicating the angular displacement of the scanning mirror 11 is detected by both of the first light receiving portion 14A and the second light receiving portion 14B. Since the angular displacement of the scanning mirror 11 is detected by the both light receiving portions of the first light receiving portion 14A and the second light receiving portion 14B, it is possible to detect the angular displacement of the scanning mirror 11 with higher accuracy.

Since the scanning mirror 11 is displaced so that the predetermined irradiation position is irradiated with the light emitted from the first light source 12 based on this position information, the predetermined irradiation position can be irradiated with high accuracy with the light emitted from the first light source 12.

In the embodiment of the invention, the first light receiving portion 14A and the second light receiving portion 14B were composed of the non-split type photodiodes, but may be composed of the split type photodiodes. By composing the first light receiving portion 14A and the second light receiving portion 14B of the split type photodiodes, it is possible to detect with high accuracy positions of the light receiving regions of the lights which reach light receiving faces of the first light receiving portion 14A and the second light receiving portion 14B. Accordingly, it is possible to produce the electronic signal containing the position information which indicates the angular displacement of the scanning mirror 11 with higher accuracy. Since the posture of the scanning mirror 11 is controlled on the basis of this position information, it is possible to irradiate the predetermined irradiation position with higher accuracy with the light emitted from the first light source 12.

Figure 15:
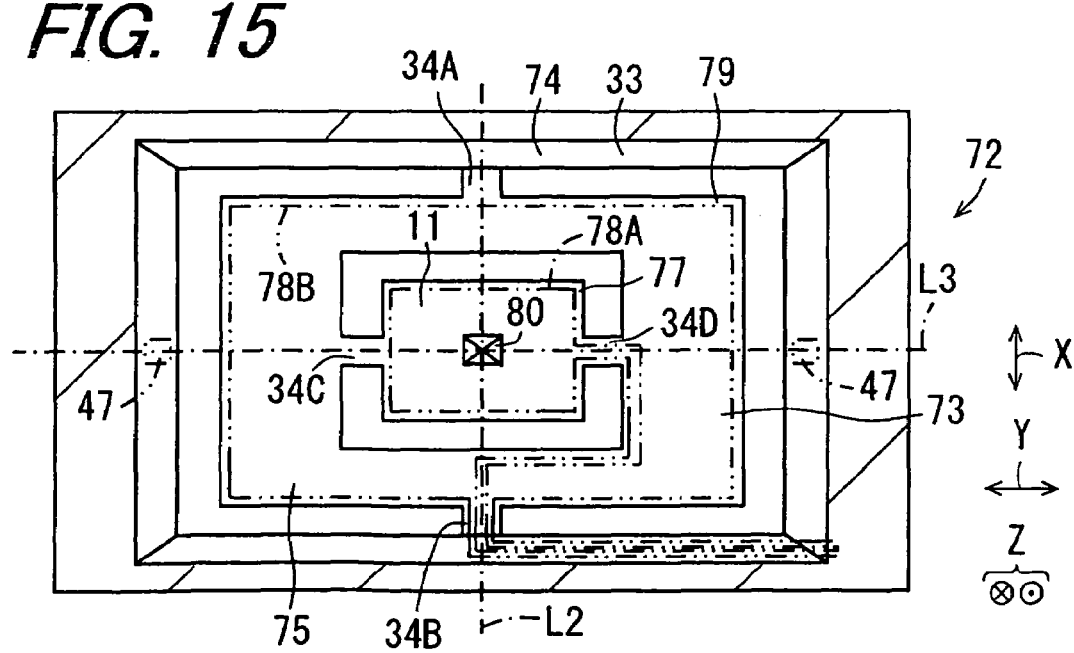
FIG. 15 is a sectional view showing a light scanning apparatus according to a sixth embodiment of the invention.
Figure 16:
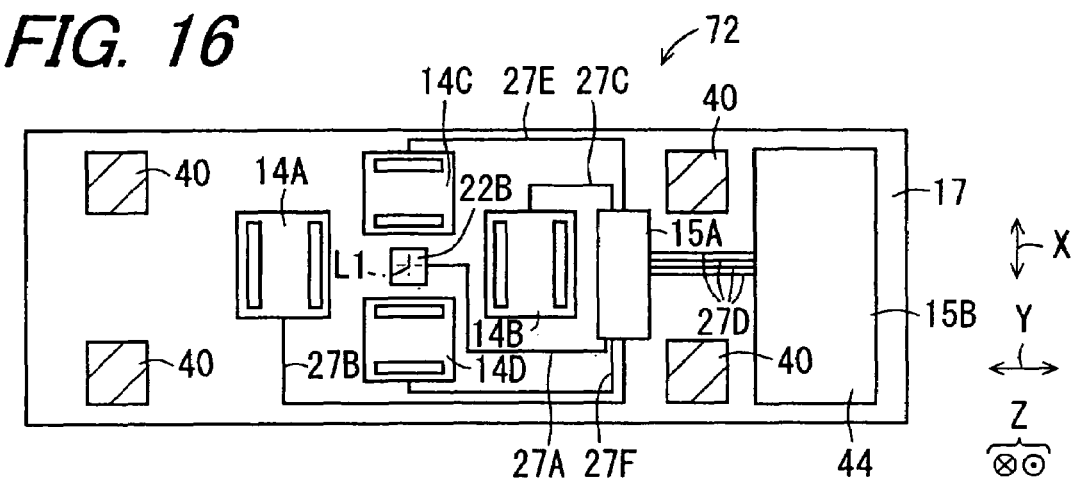
FIG. 16 is a sectional view showing the light scanning apparatus according to the sixth embodiment of the invention.

FIGS. 15 and 16 are sectional views each showing a light scanning apparatus 72 according to a sixth embodiment of the invention.

The light scanning apparatus 72 comprises a scanning mirror 11, a first light source 12, a second light source 13, a first light receiving portion 14A, a the second light receiving portion 14B, a third light receiving portion 14C, and a fourth light receiving portion 14D, a first integrated circuit 15A, a second integrated circuit 15B, the base 17, a first retaining frame 73, a second retaining frame 74, and a driving section 21.

Since the light scanning apparatus 72 according to the sixth embodiment has the same constitution as that of the light scanning apparatus 10 according to the first embodiment, corresponding portions are denoted by the same reference numerals so that overlapping descriptions thereof will be omitted. Since the light scanning apparatus 72 according to the sixth embodiment is similar to the light scanning apparatus 10 according to the first embodiment, the same effects of the light scanning apparatus 10 according to the first embodiment are obtained also in the light scanning apparatus 72 according to the embodiment.

On the one surface portion 26 in the thickness direction of the base 17 are disposed the second light emitting element 22B, the first light receiving portion 14A, the second light emitting portion 14B, the third light emitting portion 14C, the fourth light emitting portion 14D, the first integrated circuit 15A, and the second integrated circuit 15B. On the surface portion 26 in the thickness direction of the base 17 is formed predetermined wirings. The wirings include the first wiring 27A, the second wiring 27B, the third wiring 27C, the fourth wiring 27D, a fifth wiring 27E, and a sixth wiring 27F. The second light emitting element 22B and the first integrated circuit 15A are electrically connected to each other via the first wiring 27A. The first light receiving portion 14A and the first integrated circuit 15A are electrically connected to each other via the second wiring 27B. The second light receiving portion 14B and the first integrated circuit 15A are electrically connected to each other via the third wiring 27C. The third light receiving portion 14C and the first integrated circuit 15A are electrically connected to each other via the fifth wiring 27E. The fourth light receiving portion 14D and the first integrated circuit 15A are electrically connected to each other via the sixth wiring 27F. The first integrated circuit 15A and the second integrated circuit 15B are electrically connected to each other via the fourth wiring 27D.

The scanning mirror 11 has a schematic rectangular parallelepiped shape formed of a platy body. The scanning mirror 11 is supported by the first retaining frame 73 so as to be angularly displaceable about a third axial line L3 extending in a longitudinal direction of the scanning mirror 11. The first retaining frame 73 is supported by the second retaining frame 74 so as to be angularly displaceable about the second axial line L2. The third axial line L3 is orthogonal to the first axial line L1 and the second axial line L2 at the center of the scanning mirror 11.

The second retaining frame 74 has the same constitution as that of the above-described retaining frame 20 of the light scanning apparatus 10 according to the first embodiment. That is to say, the second retaining frame 74 comprises a frame 33, a first coupling portion 34A, and a second coupling portion 34B.

On the first retaining frame 73 are formed predetermined wirings. The first retaining frame 73 comprises a frame 75, a third coupling portion 34C, and a fourth coupling portion 34D. The first retaining frame 73 is provided so that a thickness direction thereof corresponds to the first direction Z. The thickness direction of the first retaining frame 73 means a direction in which a central axis of the frame 75 extends. The first retaining frame 73 is respectively connected to the first coupling portion 34A and the second coupling portion 34B. The first retaining frame 73 is thus connected physically to the frame 33 via these first coupling portion 34A and second coupling portion 34B. The third coupling portion 34C passes through the third axial line L3, and protrudes from an inner circumferential face on one side in the third direction Y of the frame 75, facing the scanning mirror 11. The fourth coupling portion 34D passes through the third axial line L3, and protrudes from the inner circumferential face on other side in the third direction Y of the frame 75, facing the scanning mirror 11. The scanning mirror 11 is respectively connected to the third coupling portion 34C and third coupling portion 34D. The scanning mirror 11 is thus connected physically to the frame 75 via these third coupling portion 34C and fourth coupling portion 34D.

A circumferential edge portion 77 of the scanning mirror 11 has a first loop-shaped coil 78A formed thereon. One end and the other end of this first coil 78A are electrically connected to the coil driving section 44 via the wirings formed on the first retaining frame 73, second retaining frame 74, connecting portion 40, and base 17. A circumferential edge portion 79 of the first retaining frame 73 has a second loop-shaped coil 78B formed thereon. One end and the other end of this second coil 78B are electrically connected to the coil driving section 44 via the wirings formed on the second retaining frame 74, connecting portion 40, and base 17.

On the second retaining frame 74 is formed the permanent magnet 47 as in the case of the above-described light scanning apparatus 10 according to the first embodiment. By providing the permanent magnet 47, a magnetostatic field is generated which penetrates a region surrounded by the first loop-shaped coil 78A and the second loop-shaped coil 78B, from one side to the other side in the first direction Z. When electric current flows in the first loop-shaped coil 78A and the second loop-shape coil 78B disposed in the magnetostatic field, Lorentz force is generated. This Lorentz force makes the scanning mirror 11 be angularly displaced about the second axial line L2 and the third axial lien L3. A magnitude of the Lorentz force depends on an amount of electric current flowing in the first loop-shaped coil 78A and the second loop-shape coil 78B. A direction of the Lorentz force depends on directions of the electric current flowing in the first loop-shaped coil 78A and the second loop-shape coil 78B. By so doing, the driving section 21 controls the angular displacement of the scanning mirror 11 which is angularly displaced about the second axial line L2 and the third axial line L3.

On the center portion of the one surface 30 in the thickness direction of the scanning mirror 11 is formed the first reflecting mirror 50A for reflecting a light, as in the case of the constitution shown in FIG. 2. The light source 12 is provided on one side in the first direction Z of the scanning mirror 11, and emits a light to the first reflecting mirror 50A of the scanning mirror 11. The control section 25 controls the first driving section 23A. The first driving section 23A makes the first light emitting element 22A emit a light based on the control command given from the control section 25. The driving section 21 controls the angular displacement of the scanning mirror 11. By so doing, the light emitted from the first light emitting element 22A is reflected in a predetermined direction by the first reflecting mirror 50A. This makes it possible to irradiate a predetermined irradiation position with the light emitted from the first light emitting element 22A.

In order that the driving section 21 controls the angular displacement of the scanning mirror 11, the amount of angular displacement from the standard posture of the scanning mirror 11 about the second axial line L2 and third axial lien L3 has to be detected.

Hereinafter, a mechanism for detecting the angular displacement of the scanning mirror 11 will be described.

The second light emitting element 22B is provided on the first axial line L1 of the one surface portion 26 in the thickness direction of the base 17. The first light receiving portion 14A, the second light receiving portion 14B, the third receiving portion 14C, and the fourth receiving portion 14D are composed of the non-split type photodiodes. The first light receiving portion 14A is disposed on one side in the third direction Y of the second light emitting element 22B. The second light receiving portion 14B is disposed on the other side in the third direction Y of the second light emitting element 22B. The third light receiving portion 14C is disposed on one side in the second direction X of the second light emitting element 22B. The fourth light receiving portion 14D is disposed on the other side in the second direction X of the second light emitting element 22B. The first light receiving portion 14A and the second light receiving portion 14B are disposed so as to be capable of detecting a position in the third direction Y of the light receiving region which is irradiated with the light. The third light receiving portion 14C and the fourth light receiving portion 14D are disposed so as to be capable of detecting a position in the second direction X of the light receiving region which is irradiated with the light.

On the other surface portion in the thickness direction of the scanning mirror 11, passing through the first axial line L1, is formed a reflecting protrusion 80 having a shape of quadrangular pyramid. A side face of the reflecting protrusion 80 has a shape of isosceles triangle. Each side of a bottom face of the reflecting protrusion 80 extends in parallel with the second direction X or the third direction Y. The second light emitting element 22B emits a light toward an apex of the reflecting protrusion 80. Each side face of the reflecting protrusion 80 has a predetermined reflectivity, and reflects the light emitted from the second light emitting element 22B.

The light emitted from the second light emitting element 22B is reflected by the side face of the reflecting protrusion 80 and according to the amount of angular displacement of the scanning mirror 11, reaches a light receiving face of the first light receiving portion 14A, second light receiving portion 14B, third light receiving portion 14C, or fourth light receiving portion 14D. By use of the first light receiving portion 14A, second light receiving portion 14B, third light receiving portion 14C, or fourth light receiving portion 14D, and the signal output section 24, it is possible to produce the electronic signal containing the position information indicating a position of the light receiving region which is irradiated with the reflected light. A reflection angle of the light which is emitted from the second light emitting element 22B and reflected by the reflecting protrusion 80 can be obtained from the position information. This reflection angle contains the information indicating the amount of angular displacement of the scanning mirror 11. Accordingly, it is possible to obtain from the position information the amount of angular displacement from the standard position of the scanning mirror 11 about the second axial line and the third axial line. Moreover, the light emitted from the second light emitting element 22B enters the reflecting protrusion 80 at a slant. Accordingly, when the scanning mirror is at the standard posture without the reflecting protrusion 80, in a case where the lights emitted from the second light emitting element 22B enters the reflecting protrusion 80 at a slant, the distance that the light proceeds from the second light emitting element 22B to the first light receiving portion 14A, the second light receiving portion 14B, the third light receiving portion 14C, or the fourth light receiving portion 14D becomes longer than a case where the light emitted from the second light emitting element 22B vertically enters the other surface 31 in the thickness direction of the scanning mirror 11. Accordingly, in a case where the light emitted from the second light emitting element 22B enters the reflecting protrusion 80 at a slant, by the angular displacement of the scanning mirror 11, a change amount of position of the light receiving regions on the first light receiving portion 14A, second light receiving portion 14B, third light receiving portion 14C, and fourth light receiving portion 14D which are irradiated with the light becomes larger. Consequently, it is possible to detect the angular displacement of the scanning mirror 11 with higher accuracy.

The control section 25 controls, on the basis of the position information of the scanning mirror 11, the electric current and direction thereof flowing in the first loop-shaped coil 78A and second loop-shape coil 78B so as to control the amount of angular displacement of the scanning mirror 11 about the first axial line L1 and the second axial line L2. By controlling the amount of angular displacement of the scanning mirror 11, it is possible to reflect the light emitted from the first light source 12, in a direction which is predetermined by the first reflecting mirror 50A. This makes it possible to irradiate the predetermined irradiation position with the light emitted from the first light source 12.

In the embodiment of the invention, the first light receiving portion 14A, the second light receiving portion 14B, the third light receiving portion 14C, and the fourth light receiving portion 14D were composed of the non-split type photodiodes, but may be composed of the split type photodiodes. By composing the first light receiving portion 14A, second light receiving portion 14B, third light receiving portion 14C, and fourth light receiving portion 14D of the split type photodiodes, it is possible to detect with high accuracy positions of the light receiving regions of the lights which reach light receiving faces of the first light receiving portion 14A, second light receiving portion 14B, third light receiving portion 14C and fourth light receiving portion 14D. Accordingly, it is possible to produce the electronic signal containing the position information which indicates the angular displacement of the scanning mirror 11 with higher accuracy. Since the posture of the scanning mirror 11 is controlled on the basis of this position information, it is possible to irradiate the predetermined irradiation position with higher accuracy with the light emitted from the first light source 12.

Figure 17:
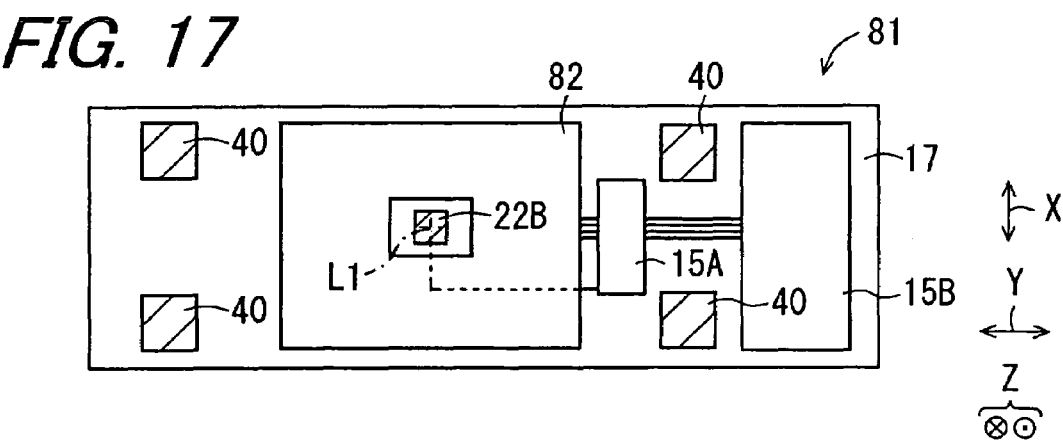
FIG. 17 is a sectional view showing a light scanning apparatus according to a seventh embodiment of the invention.

FIG. 17 is a sectional view showing a light scanning apparatus 81 according to a seventh embodiment of the invention.

The light scanning apparatus 81 comprises a scanning mirror 11, a first light source 12, a second light source 13, a light receiving portion 82, a first integrated circuit 15A, a second integrated circuit 15B, a base 17, a first retaining frame 73, a second retaining frame 74, and a driving section 21.

Since the light scanning apparatus 81 according to the seventh embodiment has the same constitution as that of the light scanning apparatus 72 according to the sixth embodiment, corresponding portions are denoted by the same reference numerals so that overlapping descriptions thereof will be omitted. Since the light scanning apparatus 81 according to the seventh embodiment is similar to the light scanning apparatus 72 according to the sixth embodiment, the same effects of the light scanning apparatus 72 according to the sixth embodiment are obtained also in the light scanning apparatus 81 according to the embodiment.

The light receiving portion 82 is provided on one surface portion 26 in the thickness direction of the base 17. The light receiving portion 82 is a two-dimensional position detecting PSD, being composed of the non-split photodiodes. As seen from the one side in the first direction Z, the light receiving portion 82 is provided on the one surface portion 26 in the thickness direction of the base 17 so as to surround the second light emitting element 22B. The light receiving portion 82 is electrically connected to the first integrated circuit 15A via the wirings previously formed on the base 17.

The light emitted from the second light emitting element 22B is reflected by the reflecting protrusion 80, and arrived at a light receiving face of the light receiving portion 82. Since the light receiving portion 82 is composed of the two-dimensional position detecting PSD, by use of the light receiving portion 82 and the output portion 24, it is possible to produce the electronic signal containing the position information indicating a position of the light receiving region which is irradiated with the reflected light. It is possible to obtain from the position information the reflection angle of the light reflected by the reflecting protrusion 80. This reflection angle contains the information indicating the amount of angular displacement of the scanning mirror 11. Accordingly, it is possible to obtain from the position information the amount of angular displacement from the standard position of the scanning mirror 11 about the second axial line and the third axial line.

The control section 25 controls, on the basis of the position information of the scanning mirror 11, the electric current and direction thereof flowing in the first loop-shaped coil 78A and second loop-shaped coil 78B so as to control the amount of angular displacement of the scanning mirror 11 about the first axial line L1 and the second axial line L2. By controlling the amount of angular displacement of the scanning mirror 11, it is possible to reflect the light emitted from the first light source 12, in a direction which is predetermined by the first reflecting mirror 50A. By so doing, the predetermined irradiation position can be irradiated with the light emitted from the first light source 12.

In the embodiment of the invention, the light receiving portion 82 was composed of the non-split type photodiodes, but may be composed of the split type photodiodes. By composing the light receiving portion 82 of the split type photodiodes, it is possible to detect with higher accuracy a position of the light receiving region of the light which is emitted from the second light emitting element 22B and arrived at the light receiving face of the light receiving portion 82. Accordingly, it is possible to produce the electronic signal containing the position information which indicates the angular displacement of the scanning mirror 11 with higher accuracy. Since the posture of the scanning mirror 11 is controlled on the basis of this position information, it is possible to irradiate the predetermined irradiation position with higher accuracy with the light emitted from the first light source 12.

In the embodiment of the invention, as seen from the one side in the first direction Z, the light receiving portion 82 was provided on the one surface portion 26 in the thickness direction of the base 17 so as to surround the second light emitting element 22B. However, the second light emitting element 22B may be provided on the one surface in the first direction Z of the light receiving portion 82. By providing the second light emitting element 22B on the one surface in the first direction Z of the light receiving portion 82, it is possible to detect a light which is reflected in the vicinity of the second light emitting element 22B as seen from the one side in the first direction Z. This enlarges a range where the angular displacement of the scanning mirror 11 can be detected.

Figure 18:
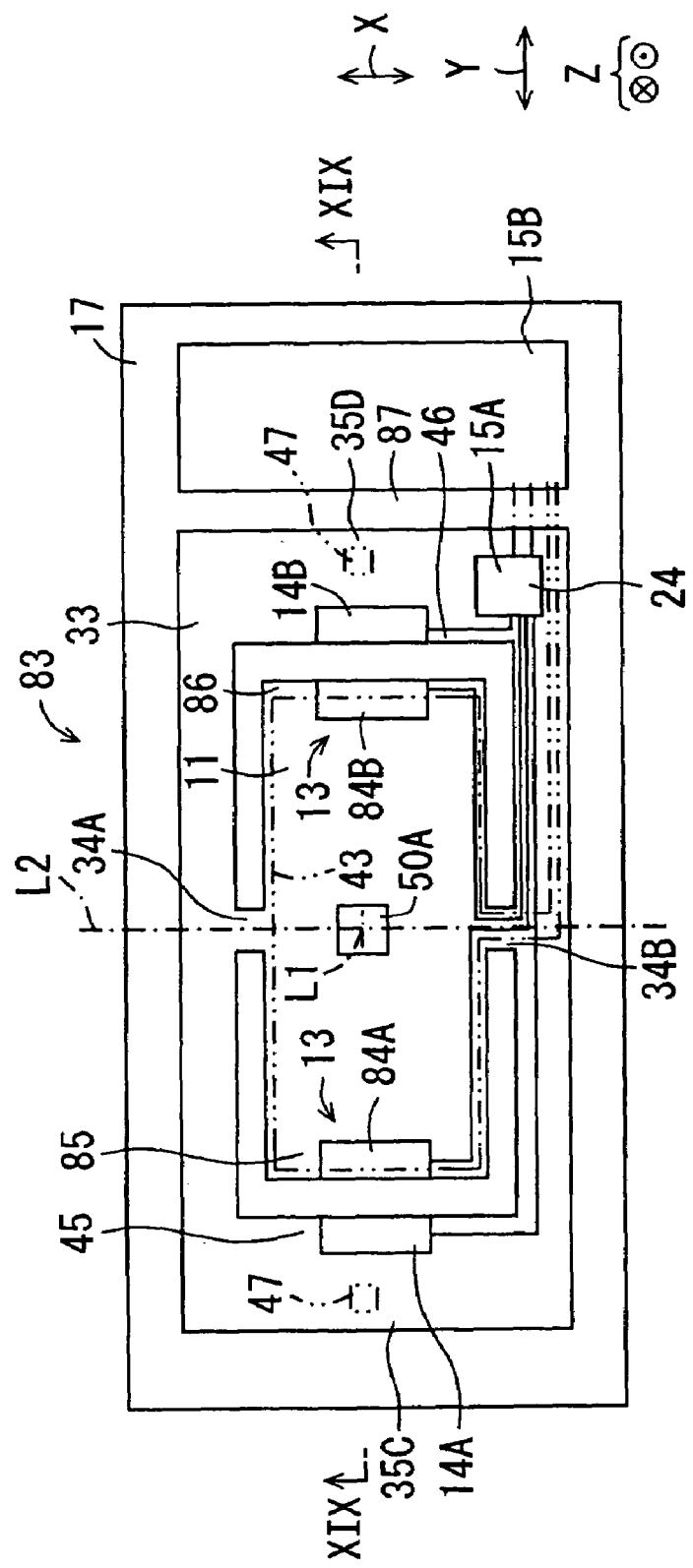
FIG. 18 is a plan view showing a light scanning apparatus according to an eighth embodiment of the invention.
Figure 19:
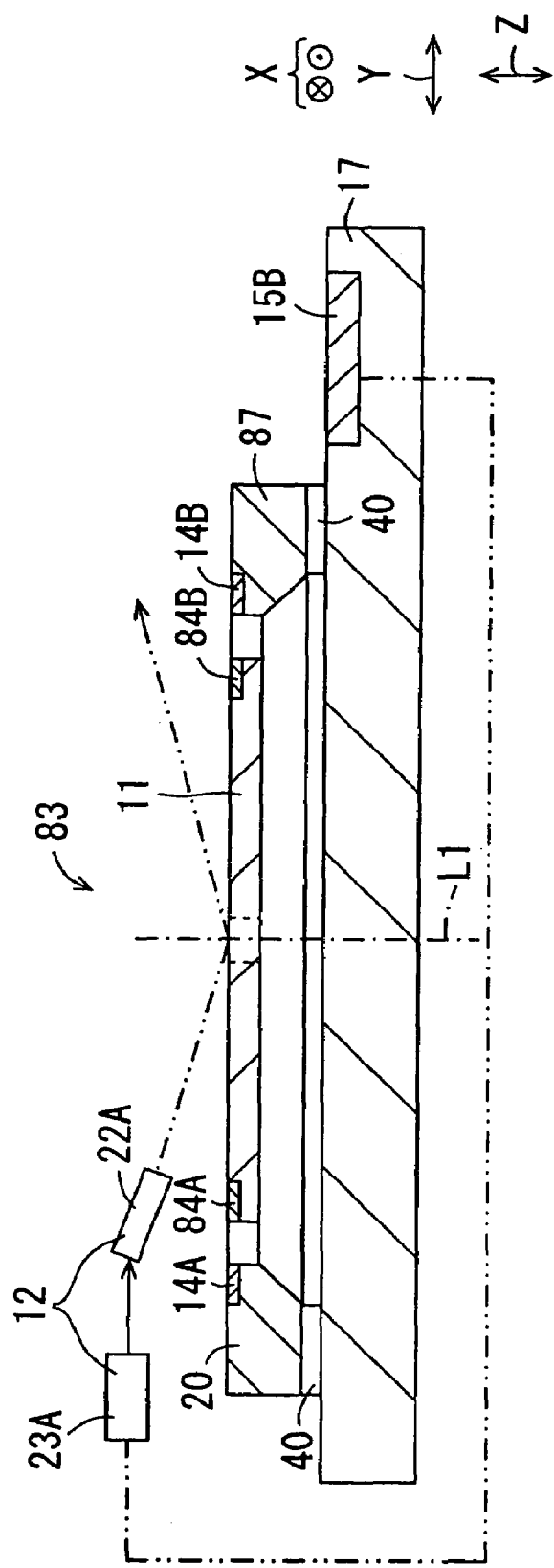
FIG. 19 is a sectional view showing the light scanning apparatus taken along sectional lines XIX-XIX lines of FIG. 18.

FIG. 18 is a plan view showing a light scanning apparatus 83 according to an eighth embodiment of the invention. FIG. 19 is a sectional view showing the light scanning apparatus 83 taken along sectional lines XIX-XIX lines of FIG. 18

The light scanning apparatus 83 comprises a scanning mirror 11, a first light source 12, a second light source 13, a first light receiving portion 14A, a second light receiving portion 14B, a first integrated circuit 15A, a second integrated circuit 15B, a base 17, a retaining frame 20, and a driving section 21. Since the light scanning apparatus 83 according to the eighth embodiment has the same constitution as that of the above-described light scanning apparatus 10 according to the first embodiment, corresponding portions are denoted by the same reference numerals so that overlapping descriptions thereof will be omitted. Since the light scanning apparatus 83 according to the eighth embodiment is similar to the light scanning apparatus 10 according to the first embodiment, the same effects of the light scanning apparatus 10 according to the first embodiment are obtained also in the light scanning apparatus 83 according to the eighth embodiment.

The second light source 13 comprises a second light emitting element 84A, a third light emitting element 84B, and a second driving section 23B. The second light emitting element 84A is provided on one end portion 85 in the longitudinal direction of the scanning mirror 11. The third light emitting element 84B is provided on the other end portion 86 in the longitudinal direction of the scanning mirror 11. The first light receiving portion 14A is provided on one side face portion 45 of the third retaining frame forming portion 35C, facing the second light emitting element 84A. The second light receiving portion 14B is provided on one side face portion 46 of the fourth retaining frame forming portion 35D, facing the third light emitting element 84B. The first integrated circuit 15A is provided on one surface portion 87 in the first direction Z of the retaining frame 20. The first light receiving portion 14A and second light receiving portion 14B, and the first integrated circuit 15A are electrically connected to each other via the wirings previously formed on the scanning mirror 11 and retaining frame 20. The second light emitting element 84A and third light emitting element 84B, and the first integrated circuit 15A are electrically connected to each other via the wirings previously formed on the scanning mirror 11 and retaining frame 20. The first integrated circuit 15A and the second integrated circuit 15B are electrically connected to each other via the wirings previously formed on the retaining frame 20, connecting portion 40, and the base 17.

The second light emitting element 84A emits a light from the other side toward the one side in the third direction Y. A light receiving region of the first light receiving portion 14A is irradiated with a light by the second light emitting element 84A. The third light emitting element 84B emits a light from the one side toward the other side in the third direction Y. A light receiving region of the second light receiving portion 14B is irradiated with a light by the third light emitting element 84B.

The first light receiving portion 14A and the second light receiving portion 14B are composed of the non-split type photodiodes. Moreover, the first light receiving portion 14A and the second light receiving portion 14B are provided so as to be capable of detecting a position in the first direction Z on light receiving faces on which position a light impinges, when the scanning mirror 11 is at the standard posture.

In a case where the scanning mirror 11 is angularly displaced about the second axial line, the second light emitting element 84A and the third light emitting element 84B are also angularly displaced about the second axial line. At this time, positions of the light receiving regions change on the first light receiving portion 14A and second light receiving portion 14B which are irradiated with lights. Since the first light receiving portion 14A and the second light receiving portion 14B can detect the positions of the light receiving regions irradiated with lights, it is possible to detect change of the positions of the light receiving regions on the first light receiving portion 14A and second light receiving portion 14B which are irradiated with lights. By use of the second light receiving portion 14B and the signal output section 24, it is possible to produce the electronic signal containing the position information which indicates the positions of the light receiving regions on the first receiving portion 14A and second light receiving portion 14B which are irradiated with lights. From this position information, the amount of angular displacement of the scanning mirror 11 can be obtained.

The light scanning apparatus 83 according to the embodiment comprised a second light source 13, a second light emitting element 84A, and a third light emitting element 84B. However, the number of the light emitting elements constituting the second light source is not limited to two, but may be one or three or more.

In the light scanning apparatus 83 according to the embodiment, the second light emitting element 84A is provided on the one end portion 85 in the longitudinal direction of the scanning mirror 11 while the third light emitting element 84B is provided on the other end portion 86 in the longitudinal direction of the scanning mirror 11. That is to say, the second light emitting element 84A and the third light emitting element 84B are provided on end portions of the scanning mirror 11, away from the second axial line L2. When the second light emitting element 84A and the third light emitting element 84B are provided on the end portions farther away from the second axial line L2, the amount of displacement becomes larger at the time of the angular displacement of the scanning mirror 11 about the second axial line L2. In a case where the second light emitting element 84A and the third light emitting element 84B are provided on the end portions of the scanning mirror 11, away from the second axial line L2, a relative position between the second light emitting element 84A and the first light receiving portion 14A, and a relative position between the third light emitting element 84B and the second light receiving portion 14B largely change when the scanning mirror 11 is angularly displaced. By so doing, in a case where the second light emitting element 84A and the third light emitting element 84B are provided on the end portions of the scanning mirror 11, away from the second axial line L2, a position on the first light receiving portion 14A on which position a light impinges, and a position on the second light receiving portion 14B on which position a light impinges largely change when the scanning mirror 11 is angularly displaced. Accordingly, it is possible to produce the electronic signal containing the position information which indicates the angular displacement of the scanning mirror 11 with higher accuracy.

The control section 25 controls, on the basis of the position information of the scanning mirror 11, the electric current and direction thereof flowing in the loop-shaped coil 43 on the scanning mirror 11 so as to control the amount of angular displacement of the scanning mirror 11. By controlling the amount of angular displacement of the scanning mirror 11, it is possible to reflect the light emitted from the first light source 12, in a direction which is predetermined by the first reflecting mirror 50A. Since the posture of the scanning mirror 11 is controlled on the basis of the more accurate position information indicating the angular displacement of the scanning mirror 11, it is possible to irradiate the predetermined irradiation position with the light emitted from the first light source 12 with higher accuracy.

In the embodiment of the invention, the first light receiving portion 14A and the second light receiving portion 14B were composed of the non-split type photodiodes, but may be composed of the split-type photodiodes.

In the embodiment of the invention, the second light emitting element 84A and the third light emitting element 84B were provided on the scanning mirror 11 while the first light receiving portion 14A and the second light receiving portion 14B were provided on the retaining frame 20. However, the first light receiving portion 14A may be provided on a position where the second light emitting element 84A was provided, and conversely the second light emitting element 84A may be provided on a position where the first light receiving portion 14A was provided, while the second receiving portion 14B may be provided on a position where the third light emitting element 84B was provided, and conversely the third light emitting element 84B may be provided on a position where the second light receiving portion 14B was provided. In this case, the first light receiving portion 14A and the second light receiving portion 14B are disposed on the one end portion and the other end portion in the longitudinal direction of the scanning mirror 11, respectively. This decreases possibility that the light which is emitted from the first light source 12 and reflected by the first reflecting mirror 50A, enters the first light receiving portion 14A or the second light receiving portion 14B.

When the light receiving portions detect the light emitted from the first light source 12, it may be made impossible to correctly detect the amount of angular displacement of the scanning mirror 11. However, in the invention, the light receiving portions less possibly receive the light emitted from the first light source 12 and therefore, it is possible to produce the electric signal containing the position information which more correctly indicates the amount of angular displacement of the scanning mirror 11.

Figure 20:
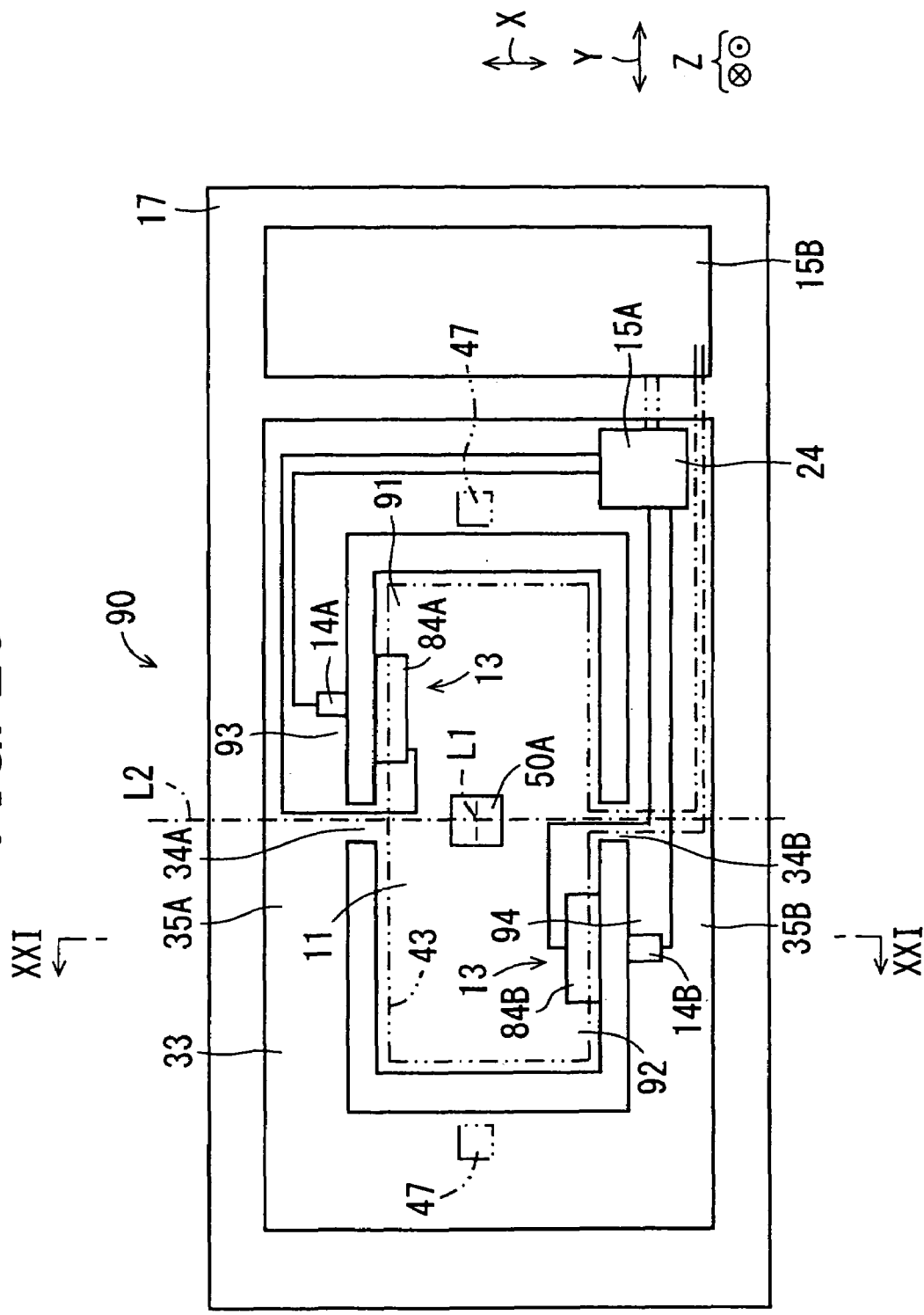
FIG. 20 is a plan view showing a light scanning apparatus according to a ninth embodiment of the invention.
Figure 21:
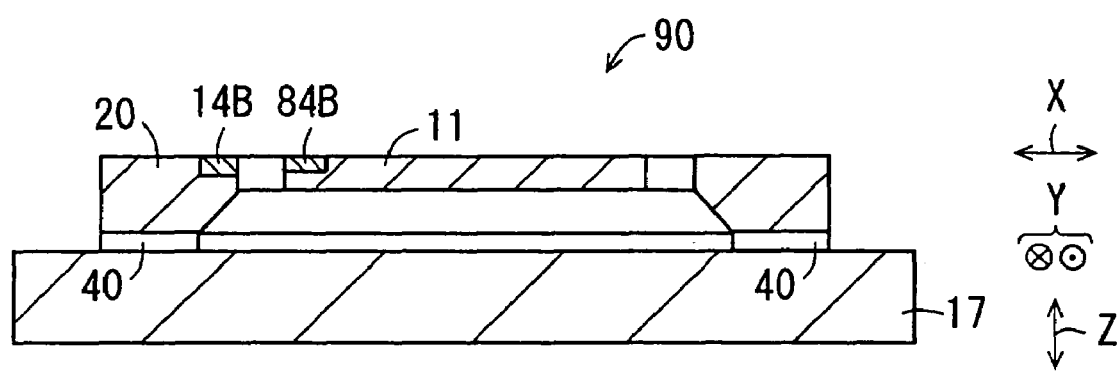
FIG. 21 is a sectional view showing the light scanning apparatus taken along sectional lines XXI-XXI lines of FIG. 20.

FIG. 20 is a plan view showing a light scanning apparatus 90 according to a ninth embodiment of the invention. FIG. 21 is a sectional view showing the light scanning apparatus 90 taken along sectional lines XXI-XXI lines of FIG. 20.

The light scanning apparatus 90 comprises a scanning mirror 11, a first light source 12, a second light source 13, a first light receiving portion 14A, a second light receiving portion 14B, a first integrated circuit 15A, a second integrated circuit 15B, a base 17, a retaining frame 20, and a driving section 21. Since the light scanning apparatus 90 according to the ninth embodiment has the same constitution as that of the above-described light scanning apparatus 83 according to the eighth embodiment, corresponding portions are denoted by the same reference numerals so that overlapping descriptions thereof will be omitted. Since the light scanning apparatus 90 according to the ninth embodiment is similar to the light scanning apparatus 83 according to the eighth embodiment, the same effects of the light scanning apparatus 83 according to the eighth embodiment are obtained also in the light scanning apparatus 90 according to the ninth embodiment.

The second light source 13 comprises a second light emitting element 84A, a third light emitting element 84B, and a second driving section 23B. The second light emitting element 84A is provided on the other side in the third direction Y from the second axial line L2 on a side face portion 91 on the one side in the second direction X of the scanning mirror 11. The third light emitting element 84B is provided on the one side in the third direction Y from the second axial line L2 on a side face portion 92 on the other side in the second direction X of the scanning mirror 11. The first light receiving portion 14A is provided on a side face portion 93 of the first retaining frame forming portion 35A, facing the second light emitting element 84A when the scanning mirror 11 is at the standard posture. The second light emitting element 84A emits a light from the other side toward the one side in the second direction X, and the first light receiving portion 14A is irradiated with the light. The second light receiving portion 14B is provided on the side face portion 92 of the second retaining frame forming portion 35B, facing the third light emitting element 84B when the scanning mirror 11 is at the standard posture. The third light emitting element 84B emits a light from the one side toward the other side in the second direction X, and the second light receiving portion 14B is irradiated with the light.

The first light receiving portion 14A and the second light receiving portion 14B are composed of the non-split type photodiodes. The first light receiving portion 14A and the second light receiving portion 14B are provided so as to be capable of detecting a position in the first direction Z of the light receiving region irradiated with a light. When the scanning mirror 11 is angularly displaced about the second axial line L2, the second light emitting element 84A and the third light emitting element 84B are also angularly displaced about the second axial line L2. Accordingly, a position irradiated with a light changes on each light receiving face of the first light receiving portion 14A and the second light receiving portion 14B. That is to say, by detecting a position on which the light impinges, in the first direction on light receiving faces of the first light receiving portion 14A and the second light receiving portion 14B, it is possible to detect the amount of angular displacement of the scanning mirror 11. By use of the second light receiving portion 14B and the signal output section 24, it is possible to produce the electronic signal containing the position information which indicates the positions of the light receiving regions on the first receiving portion 14A and second light receiving portion 14B which are irradiated with the lights. From this position information, the amount of angular displacement of the scanning mirror 11 can be obtained.

In the light scanning apparatus 90 according to the embodiment, the first light receiving portion 14A is provided on the side face portion 93 of the first retaining frame forming portion 35A, facing the second light emitting element 84A while the second light receiving portion 14B is provided on the side face portion 94 of the second retaining frame forming portion 35B, facing the third light emitting element 84B. Accordingly, a distance between the first receiving portion 14A and the second light receiving portion 84A, and a distance between the second light receiving portion 14B and the third light receiving portion 84B may be short. This makes it possible to realize downsizing of the light scanning apparatus 90.

In the embodiment of the invention, the first light receiving portion 14A and the second light receiving portion 14B were composed of the non-split type photodiodes, but may be composed of the split type photodiodes.

In the embodiment of the invention, the second light emitting element 84A and the third light emitting element 84B were provided on the scanning mirror 11 while the first light receiving portion 14A and the second light receiving portion 14B were provided on the retaining frame 20. However, the first light receiving portion 14A may be provided on a position where the second light emitting element 84A was provided, and conversely the second light emitting element 84A may be provided on a position where the first light receiving portion 14A was provided, while the second receiving portion 14B may be provided on a position where the third light emitting element 84B was provided, and conversely the third light emitting element 84B may be provided on a position where the second light receiving portion 14B was provided. In this case, the first light source 12 emits a light toward the first reflecting mirror 50A and therefore, possibility is decreased that the light emitted from the first light source 12 enters the first light receiving portion 14A and the second light receiving portion 14B.

When each light receiving portion detects the light emitted from the first light source 12, it may be made impossible to correctly detect the amount of angular displacement of the scanning mirror 11. However, in the invention, the light receiving portions less possibly receive the light emitted from the first light source 12 and therefore, it is possible to produce the electric signal containing the position information which more correctly indicates the amount of angular displacement of the scanning mirror 11.

Figure 22:
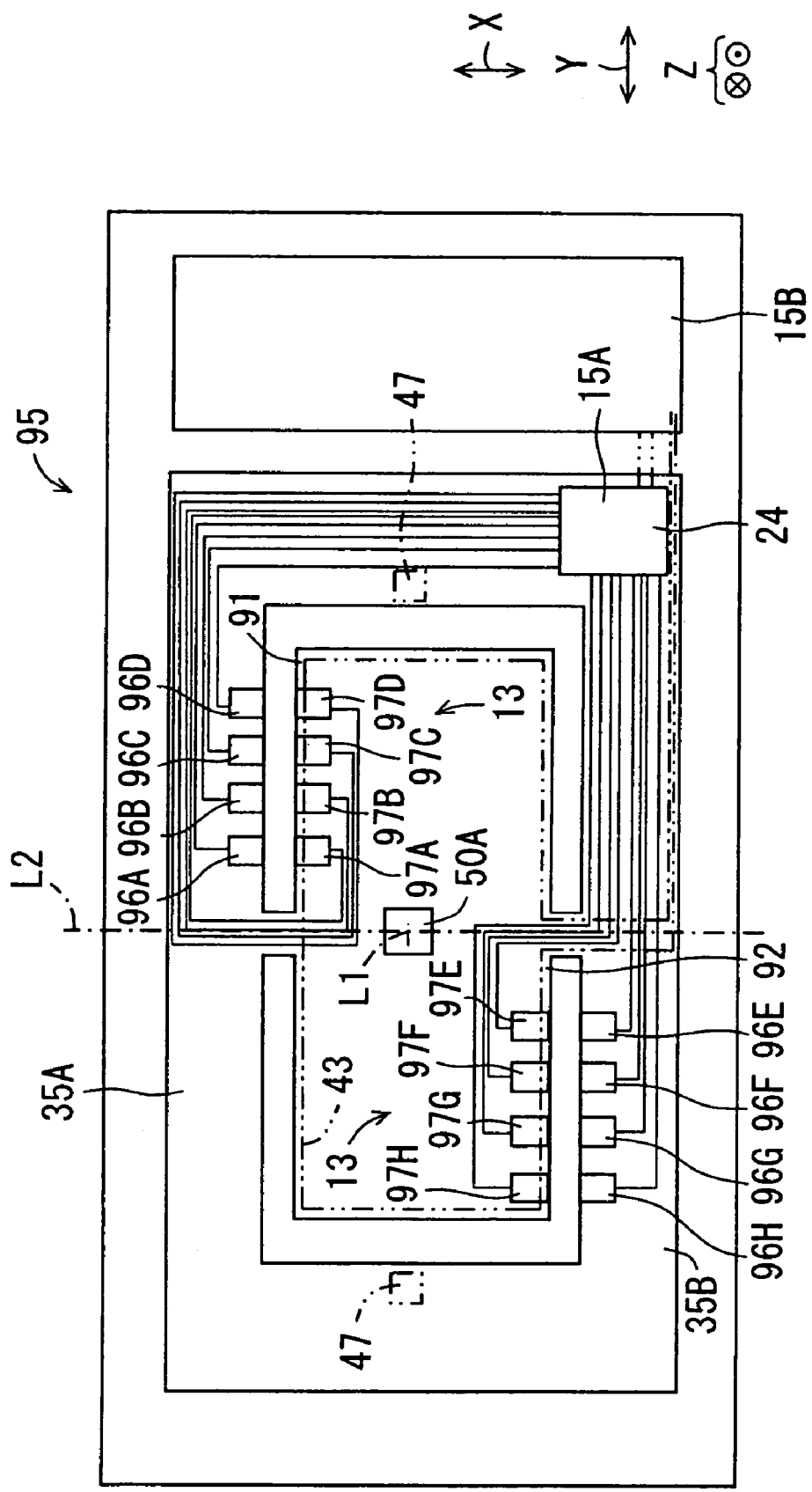
FIG. 22 is a plan view showing a light scanning apparatus according to a tenth embodiment of the invention.

FIG. 22 is a plan view showing a light scanning apparatus 95 according to a tenth embodiment of the invention.

The light scanning apparatus 95 comprises a scanning mirror 11, a first light source 12, a second light source 13, a position detecting light receiving section, a first integrated circuit 15A, a second integrated circuit 15B, a base 17, a retaining frame 20, and a driving section 21. Since the light scanning apparatus 95 according to the tenth embodiment has the same constitution as that of the above-described light scanning apparatus 90 according to the ninth embodiment, corresponding portions are denoted by the same reference numerals so that overlapping descriptions thereof will be omitted. Since the light scanning apparatus 95 according to the tenth embodiment is similar to the light scanning apparatus 90 according to the ninth embodiment, the same effects of the light scanning apparatus 90 according to the ninth embodiment are obtained also in the light scanning apparatus 95 according to the tenth embodiment.

The position detecting light receiving section comprises a first light receiving portion 96A, a second light receiving portion 96B, a third light receiving portion 96C, a fourth light receiving portion 96D, a fifth light receiving portion 96E, a sixth light receiving portion 96F, a seventh light receiving portion 96G, an eighth light receiving portion 96H, and a signal output section 24. The first to eight light receiving portions 96A to 96H are composed of the split-type photodiodes.

The second light source 13 comprises a second light emitting element 97A, a third light emitting element 97B, a fourth light emitting element 97C, a fifth light emitting element 97D, a sixth light emitting element 97E, a seventh light emitting element 97F, an eighth light emitting element 97G, a ninth light emitting element 97H, and a second driving section 23B.

The second light emitting element 97A, the third light emitting element 97B, the fourth light emitting element 97C, and the fifth light emitting element 97D are regularly spaced out on the other side in the third direction Y from the second axial line L2 on the side face portion 91 on the one side in the second direction X of the scanning mirror 11. The sixth light emitting element 97E, the seventh light emitting element 97F, the eighth light emitting element 97G, and the ninth light emitting element 97H are regularly spaced out on the one side in the third direction Y from the second axial line L2 of the side face portion 92 on the other side in the second direction X of the scanning mirror 11. The first light receiving portion 96A, the second light receiving portion 96B, the third light receiving portion 96C, and the fourth light receiving portion 96D are provided on the side face portion 93 of the first retaining frame forming portion 35A, facing the second light emitting element 97A, the third light emitting element 97B, the fourth light emitting element 97C, and the fifth light emitting element 97D, when the scanning mirror 11 is at the standard posture. The second light emitting element 97A, the third light emitting element 97B, the fourth light emitting element 97C, and the fifth light emitting element 97D emit lights from the one side toward the other side in the second direction X, and the second light emitting element 97A, the third light emitting element 97B, the fourth light emitting element 97C, and the fifth light emitting element 97D are irradiated with the lights, respectively. For instance, the second light emitting element 97A emits a light toward the first light receiving portion 96A. The fifth light receiving portion 96E, the sixth light receiving portion 96F, the seventh light receiving portion 96G, and the eighth light receiving portion 96H are provided on the side face portion 92 of the second retaining frame forming portion 35B, facing the sixth light emitting element 97E, the seventh light emitting element 97F, the eighth light emitting element 97G, and the ninth light emitting element 97H, when the scanning mirror 11 is at the standard posture. The sixth light emitting element 97E, the seventh light emitting element 97F, the eighth light emitting element 97G, and the ninth light emitting element 97H emit lights from the one side toward the other side in the second direction X, and the fifth light receiving portion 96E, the sixth light receiving portion 96F, the seventh light receiving portion 96G, and the eighth light receiving portion 96H are irradiated with the lights, respectively. For instance, the sixth light emitting element 97E emits a light toward the fifth light receiving portion 96E.

The first to eighth light receiving portions 96A to 96H are electrically connected to the first integrate circuit 15A via the wirings previously formed on the retaining frame 20. The second to ninth light emitting elements 97A to 97H are electrically connected to the first integrate circuit 15A via the wirings previously formed on the scanning mirror 11 and retaining frame 20.

The first to eighth light receiving portions 96A to 96H are provided so as to be capable of detecting positions in the first direction Z of the light receiving regions which are irradiated with lights. When the scanning mirror 11 is angularly displaced about the second axial line L2, the second to ninth light emitting elements 97A to 97H are also angularly displaced about the second axial line L2. Accordingly, positions irradiated with lights changes on each light receiving face of the first to eighth light receiving portions 96A to 96H. That is to say, by detecting positions on which the lights impinge, in the first direction on light receiving faces of the first to eight light receiving portions 96A to 96H, it is possible to detect the amount of angular displacement of the scanning mirror 11. By use of the first to eighth light receiving portions 96A to 96H and the signal output section 24, it is possible to produce the electronic signal containing the position information which indicates the positions of the light receiving regions on the first to eighth light receiving portions 96A to 96H which are irradiated with the lights. From this position information, the amount of angular displacement of the scanning mirror 11 can be obtained. In addition, since the position information is created on the basis of information which can be obtained from eight receiving portions of the first to eighth light receiving portions 96A to 96H, it is possible to create position information which indicates the angular displacement of the scanning mirror 11 with higher accuracy than a case where the position information is created on the basis of information which can be obtained from one light receiving portion.

Since the scanning mirror 11 is displaced so that the predetermined irradiation position is irradiated with the light emitted from the first light source 12 based on this position information, the predetermined irradiation position can be irradiated with high accuracy with the light emitted from the first light source 12.

In the embodiment of the invention, the first to eight light receiving portions 96A to 96H were composed of the non-split type photodiodes, but may be composed of the split-type photodiodes.

In the embodiment of the invention, the second to ninth light emitting elements 97A to 97H were provided on the scanning mirror 11 while the first to eight light receiving portions 96A to 96H were provided on the retaining frame 20. However, the first to eight light receiving portions 96A to 96H may be provided respectively on a position where the second to ninth light emitting elements 97A to 97H were provided, and conversely the second to ninth light emitting elements 97A to 97H may be provided respectively on a position where the first to eight light receiving portions 96A to 96H were provided. In this case, the first light source 12 emits a light toward the first reflecting mirror 50A and therefore, possibility is decreased that the light emitted from the first light source 12 enters the first to eight light receiving portions 96A to 96H.

Figure 23:
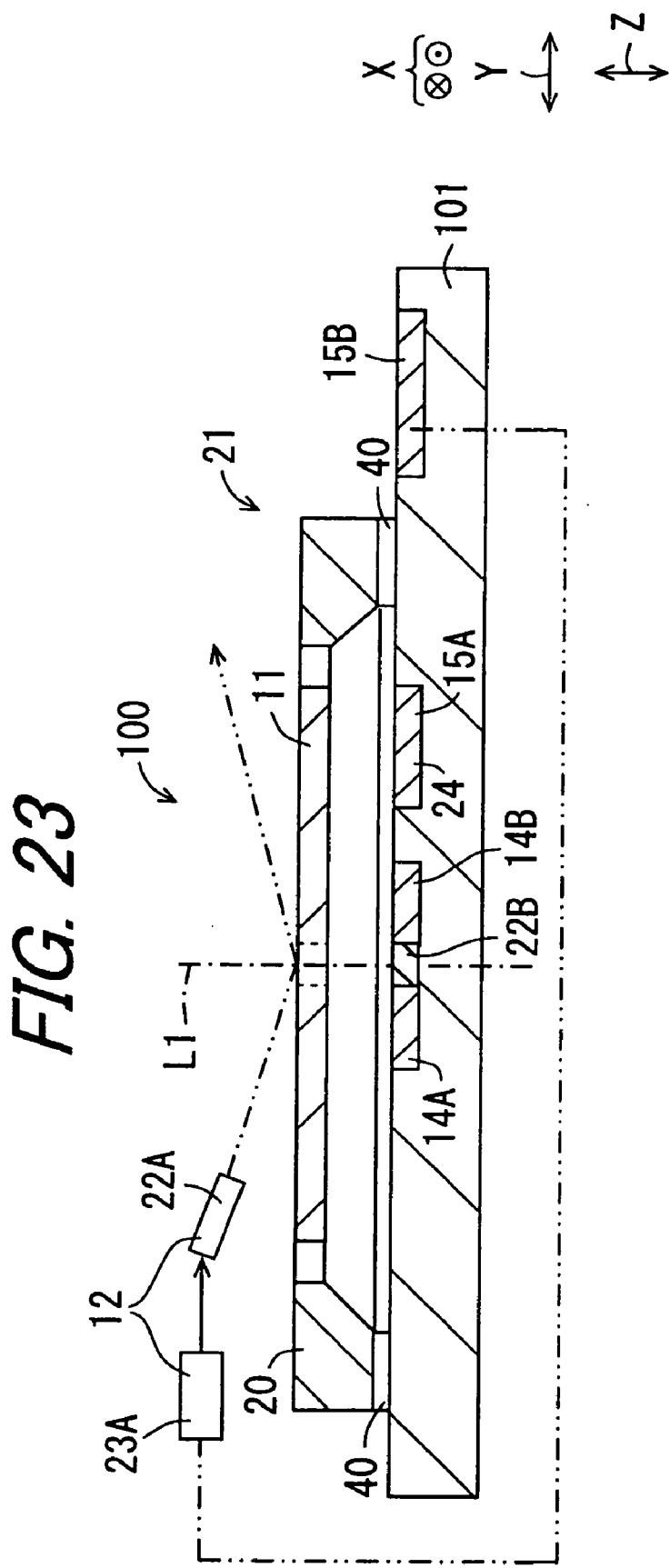
FIG. 23 is a sectional view showing a light scanning apparatus according to an eleventh embodiment of the invention.

FIG. 23 is a sectional view showing a light scanning apparatus 100 according to an eleventh embodiment of the invention.

The light scanning apparatus 100 comprises a scanning mirror 11, a first light source 12, a second light source 13, a first light receiving portion 14A, a second light receiving portion 14B, a first integrated circuit 15A, a second integrated circuit 15B, a substrate 101, a retaining frame 20, and a driving section 21. Since the light scanning apparatus 100 according to the eleventh embodiment has the same constitution as that of the above-described light scanning apparatus 10 according to the first embodiment, corresponding portions are denoted by the same reference numerals so that overlapping descriptions thereof will be omitted. Since the light scanning apparatus 100 according to the eleventh embodiment is similar to the light scanning apparatus 10 according to the first embodiment, the same effects of the light scanning apparatus 10 according to the first embodiment are obtained also in the light scanning apparatus 100 according to the eleventh embodiment.

The second light emitting element 22B, the first light receiving portion 14A, the second light receiving portion 14B, the first integrated circuit 15A, and the second integrate circuit 15B are formed integrally with a substrate 101 formed of silicon material.

The first light receiving portion 14A and the second light receiving portion 14B are formed by way of an impurity dispersing step for injecting impurities such as boron and phosphorus into the substrate 101, a step of forming electrodes, and the other steps. The first light receiving portion 14A and the second light receiving portion 14B may be composed of either the split type photodiodes or the non-split type photodiodes. The first integrated circuit 15A and the second integrated circuit 15B are formed by way of a photolithography step, the impurity dispersing step, and the other steps.

Figure 24:
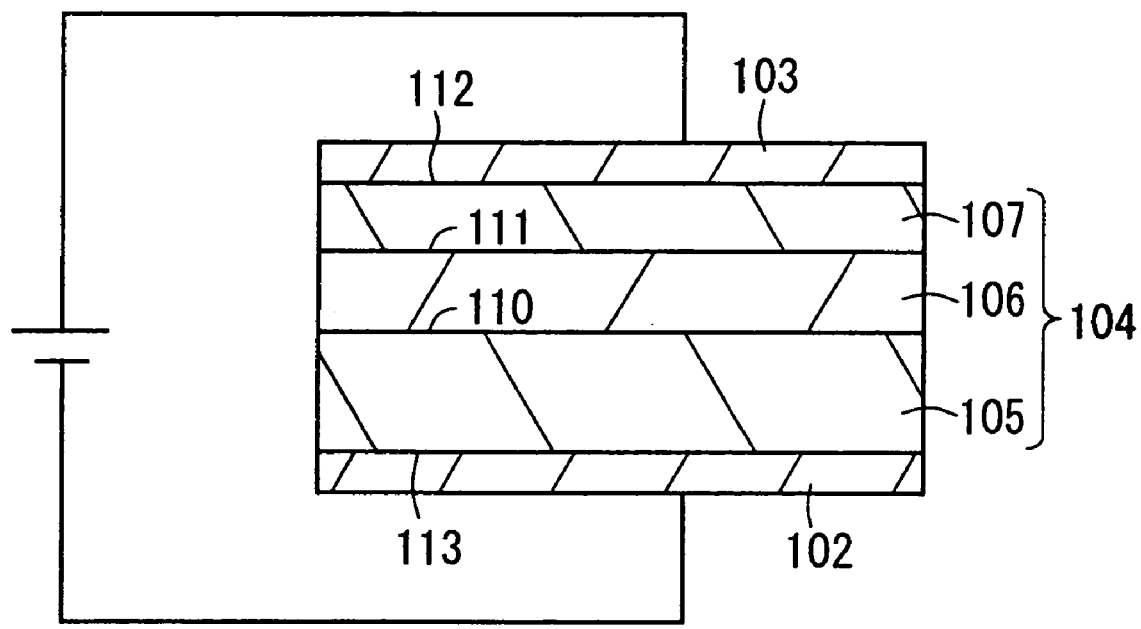
FIG. 24 is a sectional view schematically showing a second light emitting element.

FIG. 24 is a sectional view schematically showing the second light emitting element 22B. The second light emitting element 22B comprises a negative electrode 102, a positive electrode 103, and a semiconductor layer 104. The semiconductor layer 104 comprises an N-type silicon layer 105, an N-type porous silicon layer 106, and a P-type porous silicon layer 107. An N-type semiconductor formed of silicon material is made porous to be the N-type porous silicon layer 106. A P-type semiconductor formed of silicon material is made porous to be the P-type porous silicon layer 107. The N-type porous silicon layer 106 is formed on one surface 110 in a thickness direction of the N-type silicon layer 105. The P-type porous silicon layer 107 is formed on one surface 111 in a thickness direction of the N-type porous silicon layer 106. The positive electrode 103 is formed on one surface 112 in a thickness direction of the P-type porous silicon layer 107. The positive electrode 103 is formed of translucent gold, for instance. The negative electrode 102 is formed on the other surface 113 in the thickness direction of the N-type silicon layer 105. The positive electrode 103 is formed of Aluminum, for instance.

The second light emitting element 22B is formed by way of an impurity dispersing step for injecting impurities into the substrate 101, a step of anodic oxidation for making silicon porous, a step of forming electrodes, and the other steps. For an electrolyte for carrying out the anodic oxidation is used hydrogen fluoride (HF), for instance.

The substrate 101 on which the second light emitting element 22B, the first light receiving portion 14A, the second light receiving portion 14B, the first integrated circuit 15A, the second integrate circuit 15B, and the like are formed, corresponds to the base 17 according to the first embodiment.

In the embodiment of the invention, the first light receiving portion 14A, the second light receiving portion 14B, and the first integrate circuit 15A are formed integrally with the substrate 101. Since the signal output section 24 is realized by the first integrate circuit 15A, the first light receiving portion 14A, the second light receiving portion 14B, and the signal output section 24 are formed integrally with the substrate 101. In a case where the first light receiving portion 14A, the second light receiving portion 14B, and the signal output section 24 are formed integrally with the substrate 101, a distance of a wiring for electrically connecting the first light receiving portion 14A and second light receiving portion 14B with the signal output section 24, becomes shorter than a distance of the wiring in a case where the first light receiving portion 14A, the second light receiving portion 14B, and the signal output section 24 are electrically connected to the substrate 101 by wire bonding. When the distance of the wiring for connecting the first light receiving portion 14A and the second light receiving portion 14B with the signal output section 24 is longer, it becomes easier for signals other than an electronic signal produced by photoelectric conversion, to flow through the wiring as noise. When noise causing electric current flows from the first light receiving portion 14A and the second light receiving portion 14B to the signal output section 24, position information cannot be correctly produced. By integrally forming the first light receiving portion 14A, second light receiving portion 14B, and signal output section 24 in the substrate 101, the distance of the wiring for electrically connecting the first light receiving portion 14A and the second light receiving portion 14B with the signal output section 24 becomes shorter so that noise is less easily generated. In this case, the first light receiving portion 14A, the second light receiving portion 14B, and the signal output section 24 can produce the electronic signal containing the position information which indicates the posture of the scanning mirror 11 with higher accuracy.

Furthermore, the first integrated circuit 15A and the second integrated circuit 15B are formed integrally with formed integrally with the substrate 101. This shortens a distance of the wiring for electrically connecting the first integrated circuit 15A with the second integrated circuit 15B so that electric current, which will be noise, less easily flows through the wiring for electrically connecting the first integrated circuit 15A with the second integrated circuit 15B. Accordingly, the control section 25 can receive the electronic signal containing the position information which indicates the posture of the scanning mirror 11 with higher accuracy.

Since the scanning mirror 11 is displaced so that the predetermined irradiation position can be irradiated with the light emitted from the first light source 12 on the basis of this position information, it is possible to irradiate the predetermined irradiation position with further higher accuracy with the light emitted from the first light source 12.

Moreover, the first light receiving portion 14A, the second light receiving portion 14B, the second light emitting element 22B, the first integrated circuit 15A, and the second integrated circuit 15B can be formed at step of processing the substrate 101. That is to say, the first light receiving portion 14A, the second light receiving portion 14B, the second light emitting element 22B, the first integrated circuit 15A, and the second integrated circuit 15B can be formed at the same step of processing the substrate 101. Accordingly, it is possible to simplify a manufacturing process of the light scanning apparatus 100 and to hold down a manufacturing cost of the light scanning apparatus 100, compared to a case where the first light receiving portion 14A, the second light receiving portion 14B, the second light emitting element 22B, the first integrated circuit 15A, and the second integrated circuit 15B are provided in the substrate 101 at different steps.

In the embodiment of the invention, the second light emitting element 22B was a light emitting element having a constitution shown in FIG. 24. However, the second light emitting element 22B is not limited to the constitution shown in FIG. 24, and may have an any constitution as long as the second light emitting element 22B can emit a light, and the first light receiving portion 14A, the second light receiving portion 14B, the second light emitting element 22B, the first integrated circuit 15A, and the second integrated circuit 15B can be formed in the substrate 101 at the same step.

In the embodiment of the invention, the above described light emitting elements of the second light source 13, light receiving portions, and first integrated circuit 15 of the light scanning apparatuses according to the second to tenth embodiments may be integrally formed on portions formed of silicon material on which portions each component is provided. This makes it possible to produce the electronic signal containing the position information which indicates the posture of the scanning mirror 11 with higher accuracy. In addition, it is possible to simplify the manufacturing process of the light scanning apparatus and to hold down the manufacturing cost of the light scanning apparatus.

Figure 25:
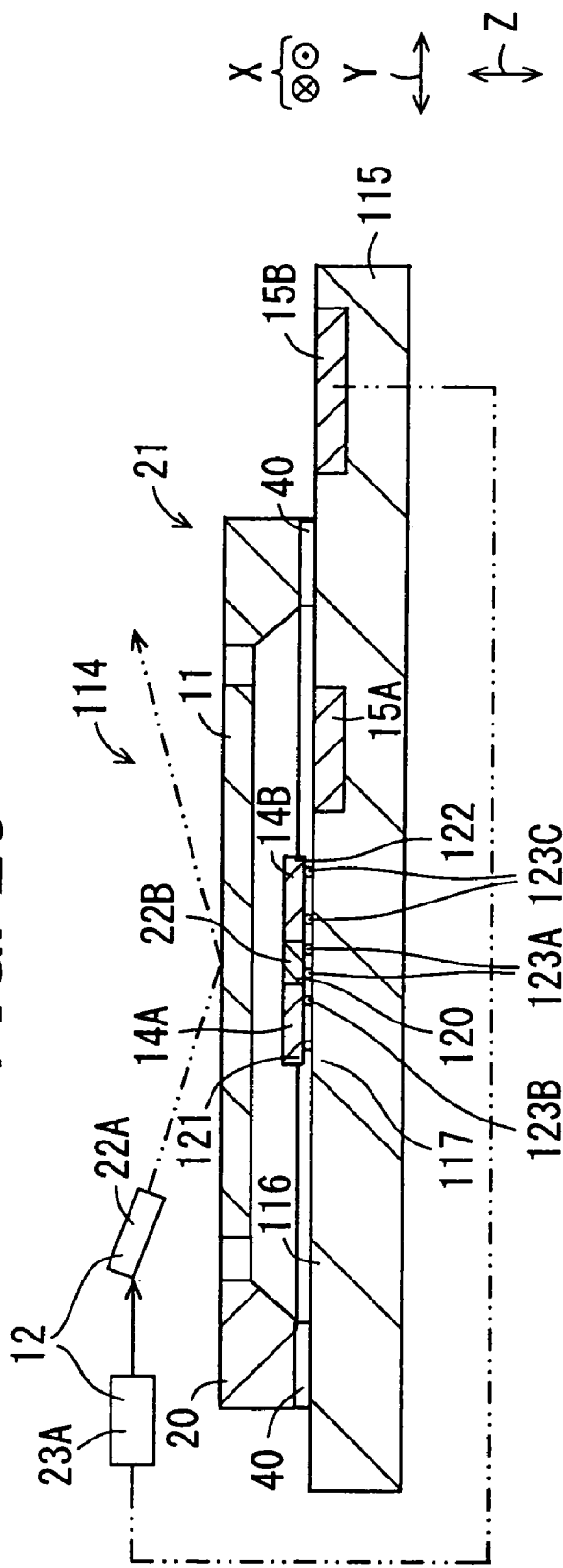
FIG. 25 is a sectional view showing a light scanning apparatus according to a twelfth embodiment of the invention.
Figure 26:
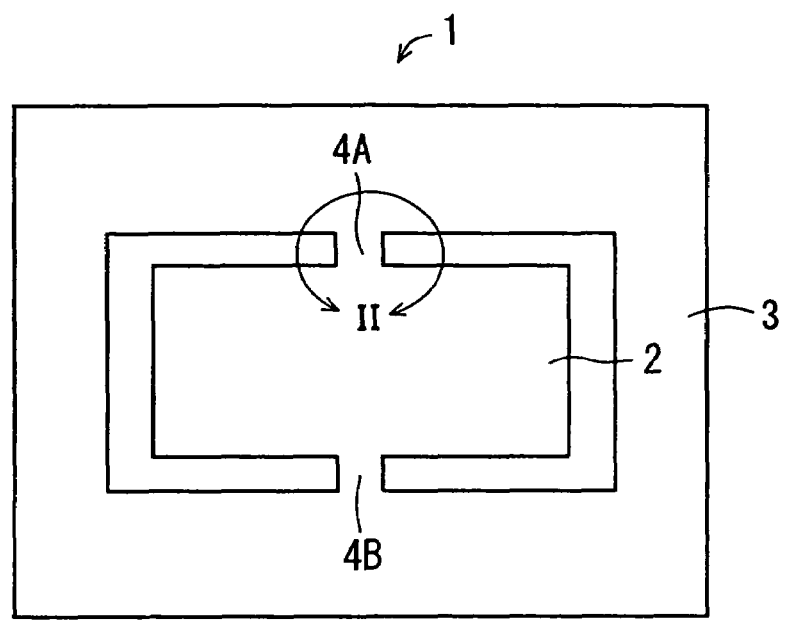
FIG. 26 is a plan view showing a first related art posture detecting device.
Figure 27:
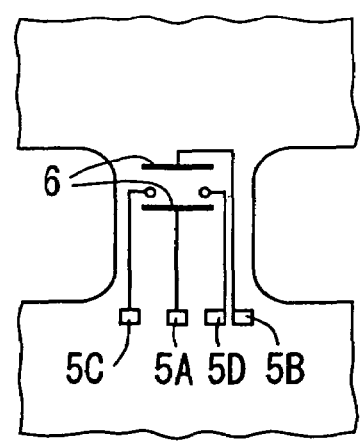
FIG. 27 is a plan view showing an enlarged region II of FIG. 26.

FIG. 25 is a sectional view showing a light scanning apparatus 114 according to a twelfth embodiment of the invention.

The light scanning apparatus 114 comprises a scanning mirror 11, a first light source 12, a second light source 13, a first light receiving portion 14A, a second light receiving portion 14B, a first integrated circuit 15A, a second integrated circuit 15B, a substrate 115, a retaining frame 20, and a driving section 21. Since the light scanning apparatus 114 according to the twelfth embodiment has the same constitution as that of the light scanning apparatus 10 according to the first embodiment, corresponding portions are denoted by the same reference numerals so that overlapping descriptions thereof will be omitted. Since the light scanning apparatus 114 according to the twelfth embodiment is similar to the light scanning apparatus 10 according to the first embodiment, the same effects of the light scanning apparatus 10 according to the first embodiment are obtained also in the light scanning apparatus 114 according to the twelfth embodiment.

In the embodiment of the invention, the second light emitting element 22B, the first light receiving portion 14A, the second light receiving portion 14B, and a substrate 115 are connected to each other by flip chip connection.

On one surface portion 116 of the substrate 115 is formed an element connecting portion 117 to which the second light emitting element 22B, the first light receiving portion 14A, and the second light emitting element 14B are connected by flip chip bonding. On one predetermined surface portion 120 of the second light emitting element 22B is formed a first connecting terminal 123A. On one predetermined surface portion 121 of the first light receiving portion 14A is formed a second connecting terminal 123B. On one predetermined surface portion 122 of the second light receiving portion 14B is formed a third connecting terminal 123C. Hereinafter, the first connecting terminal 123A, the second connecting terminal 123B, and the third connecting terminal 123C may be collectively referred to as a connecting terminal 123. The second light emitting element 22B, the first light receiving portion 14A, and the second light emitting portion 14B are connected to the element connecting portion 117 of the substrate 115 by flip chip bonding by opposing one surface thereof, on which the connecting terminal 123 is formed, to one surface 124 in a thickness direction of the substrate 115. The connection terminal 123 and the element connecting portion 117 are connected to each other by bumps formed of solder.

The substrate 115 on which the second light emitting element 22B, the first light receiving portion 14A, the second light receiving portion 14B, and the like are provided, corresponds to the base 17 according to the first embodiment.

Since the second light emitting element 22B, the first light receiving portion 14A, and the second light receiving portion 14B are connected to the substrate 115 by flip chip bonding in the embodiment of the invention, mounting density thereof becomes higher than that in a case where the second light emitting element 22B, the first light receiving portion 14A, and the second light receiving portion 14B are connected to the substrate 115 by a connecting method using TAB (tape automated bonding) or wire bonding. This makes it possible to realize downsizing of the light scanning apparatus 114.

In another embodiment of the invention, the above described light emitting elements of the second light source 13 and light receiving portions of the light scanning apparatuses according to the second to tenth embodiments may be connected by flip chip bonding to portions on which the light emitting elements and the light receiving portions are provided. This makes it possible to realize downsizing of the light scanning apparatus.

The above-described light scanning apparatus according to each embodiment can be used in devices such as a barcode reader, a retina projection display, a laser printer, and a laser projector, which read still images or moving images by a light scanning or which output still images or moving images by light scanning.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A light scanning apparatus comprising:
    a first light source for emitting a light beam with which a predetermined irradiation region is irradiated;
    a reflector for reflecting the light beam emitted from the first light source so as to lead the light beam to the predetermined irradiation region;
    a retaining frame having a plurality of coupling portions which are coupled to a circumferential edge portion of the reflector, for retaining the reflector via the coupling portions so that the reflector is angularly displaceable;
    a substrate for supporting the retaining frame;
    a second light source for emitting a light with which the reflector is to be irradiated;
    a light receiving section for receiving a reflected light which has been emitted from the second light source and reflected by the reflector;
    a driving section for angularly displacing the reflector so that the predetermined irradiation region is scanned with the light beam from the first light source; and
    a control section for controlling an angular displacement operation of the reflector through the driving section, on the basis of light receiving amount and light receiving region of the light received by the light receiving section,
    wherein the light receiving section has a light receiving element which produces an electronic signal according to the light receiving amount and light receiving region of the received light,
    wherein a signal output section which outputs an electronic signal produced by the light receiving element, and the light receiving element and the signal output section are formed integrally with the substrate, and
    wherein a light receiving surface of the light receiving section is in parallel with a reflecting surface, which reflects the light from the second light source, of the reflector in a standard angular position.

2. The light scanning apparatus of claim 1, wherein the second light source is provided so that an incident angle of a light which is emitted from the second light source and enters the reflector becomes an acute angle.

3. The light scanning apparatus of claim 1, wherein the retaining frame retains the reflector so that the reflector is angularly displaceable about a predetermined axial line, and the second light source is provided so that the light emitted from the second light source travels in parallel with a plane which is perpendicular to the predetermined axial line.

4. The light scanning apparatus of claim 1, wherein the second light source is formed integrally with the substrate.

5. The light scanning apparatus of claim 1, further comprising an element connecting portion,
wherein the second light source has a light emitting element, and
the light receiving section has a light receiving element, the light emitting element and the light receiving element being connected to the element connecting portion by flip chip bonding.

6. The light scanning apparatus of claim 1, wherein the light receiving section comprises at least two or more light receiving elements for producing an electronic signal according to the light receiving amount and light receiving region of the received light.

7. The light scanning apparatus of claim 1, wherein the first light source emits a light having a predetermined first wavelength, and the second light source emits a light having a predetermined second wavelength, and
the light receiving section has a higher light receiving sensitivity to the light having the predetermined second wavelength than to the light having the predetermined first wavelength.

8. A light scanning apparatus comprising:
a first light source for emitting a light beam with which a predetermined irradiation region is to be irradiated;
a reflector for reflecting the light beam emitted from the first light source so as to lead the light beam to the predetermined irradiation region;
a retaining frame having a plurality of coupling portions which are coupled to a circumferential edge portion of the reflector, for retaining the reflector via each of the coupling portions so that the reflector is angularly displaceable;
a second light source for emitting a light;
a light receiving section for receiving the light emitted from the second light source;
a driving section for angularly displacing the reflector so that the predetermined irradiation region is scanned with the light beam from the first light source; and
a control section for controlling an angular displacement operation of the reflector through the driving section, on the basis of light receiving amount and light receiving region of the light received by the light receiving section,
wherein the light receiving section has a light receiving element which produces an electronic signal according to the light receiving amount and light receiving region of the received light, and the second light source has a light emitting element, and
wherein the reflector is provided with one of the light emitting element and the light receiving element, and the retaining frame is provided with the other one of the light emitting element and the light receiving element.

9. The light scanning apparatus of claim 8, wherein the retaining frame retains the reflector so that the reflector is angularly displaceable about a predetermined axial line, and
one of the light emitting element and the light receiving element is provided on an end portion which is farthest away from the predetermined axial line of the reflector.

10. The light scanning apparatus of claim 8, wherein the retaining frame retains the reflector so that the reflector is angularly displaceable about a predetermined axial line, and
one of the light emitting element and the light receiving element is provided in an extending direction of the predetermined axial line on an end portion of the reflector except on the predetermined axial line, and
the second light source emits a light which proceeds in the extending direction of the predetermined axial line.

11. The light scanning apparatus of claim 8, wherein the light receiving section comprises a signal output section which outputs an electronic signal produced by the light receiving element which is formed integrally with the reflector or the retaining frame, the signal output section being formed integrally with the reflector or the retaining frame.

12. The light scanning apparatus of claim 11, wherein the light emitting element is formed integrally with the reflector or the retaining frame.

13. The light scanning apparatus of claim 8, wherein the light receiving section comprises two or more light receiving elements.

14. The light scanning apparatus of claim 8, wherein the first light source emits a light having a predetermined first wavelength, and the second light source emits a light having a predetermined second wavelength, and
the light receiving section has a higher light receiving sensitivity to the light having the predetermined second wavelength than to the light having the predetermined first wavelength.

15. The light scanning apparatus of claim 8, further comprising an element connecting portion to which the light emitting element and the light receiving element are connected by flip chip bonding.

* * * * *